United States Patent

Duginske

[11] Patent Number: 5,617,909
[45] Date of Patent: Apr. 8, 1997

[54] WOODWORKING MACHINERY JIG AND FIXTURE SYSTEM

[76] Inventor: Mark A. Duginske, 1010 First Ave., North, Wausau, Wis. 54401

[21] Appl. No.: 278,369

[22] Filed: Jul. 21, 1994

Related U.S. Application Data

[63] Continuation-in-part of Ser. No. 944,867, Sep. 14, 1992, Pat. No. 5,337,641.

[51] Int. Cl.$^6$ ..................................................... B27B 31/00
[52] U.S. Cl. ................................. 144/253.1; 144/253.5; 144/253.2; 384/40; 403/381
[58] Field of Search .............................. 83/477.2, 468.2, 83/488.1; 384/39, 40, 626; 403/63, 106, 381; 144/253.1, 253.2, 253.5

[56] References Cited

U.S. PATENT DOCUMENTS

| | | | |
|---|---|---|---|
| 1,285,628 | 11/1918 | Craley. | |
| 3,827,686 | 8/1974 | Storkh | 269/315 |
| 3,994,484 | 11/1976 | Schorr | 269/315 |
| 4,256,000 | 3/1981 | Seidel | 83/468.2 |
| 4,693,158 | 9/1987 | Price | 269/303 |
| 4,817,693 | 4/1989 | Schuler | 144/359 |
| 4,887,653 | 12/1989 | Thomas | 144/286 R |
| 5,018,562 | 5/1991 | Adams | 269/303 |
| 5,038,486 | 8/1991 | Ducate, Sr. | 33/430 |
| 5,063,983 | 11/1991 | Barry | 144/371 |

OTHER PUBLICATIONS

"Mechanical Engineers' Handbook" 1958 McGraw Hill Book Co., Inc; pp. 8–134.
"Fine Woodworking" Jul./Aug. 1985, *Remedy for a Worn Miter Guage*.
"Fine Woodworking" Apr. 1992, pp. 76, 77.
Applicant's Exhibit No. 1, front and rear cover pages and pp. 72–85 and 166 of "The 1992 Garrett Wade Tool Catalog" of Garrett Wade Company, Inc. 161 Avenue of the Americas, New York, New York 10013.
Applicant's Exhibit No. 2, admitted prior art, page entitled "Vises & Clamps".
Applicant's Exhibit No. 3, admitted prior art, page entitled "Joiner's Edge High Precision T-Slot Extrusion Modular 3-In-1 Woodworking System" of Wood Werks Supply, Inc.
Applicant's Exhibit No. 4, admitted prior art, page entitled "Farris Right Angle Gauge Lets You Make Pefect Miters of Any Angle".
Applicant's Exhibit No. 5, admitted prior art, page entitled "Power Saws".

*Primary Examiner*—W. Donald Bray
*Attorney, Agent, or Firm*—Quarles & Brady

[57] ABSTRACT

A woodworking machinery jig and fixture system includes a track which is attached to a separate plywood fence, auxiliary table or other workpiece support of woodworking machinery such as a table saw, a band saw, radial arm saw, miter saw, a drill press or a router table. A flip stop and an optional microadjuster mount to a T-shaped slot in the track. An angle bracket is also provided for making right angle connections of track to track or track to support. A location stop records the position of a track relative to a flip stop or other jig or fixture and a circle jig can be used in the track to cut circles. A miter guide, optionally having a fixed head, has a longitudinally adjustable auxiliary fence and a miter bar with an anti-play feature in which a bearing is adjusted to slide on the side of a table top slot in which the bar is received. A guideway for the miter guide has a concave bottom wall which adjustably flexes to tighten the guideway around a miter guide bar.

6 Claims, 19 Drawing Sheets

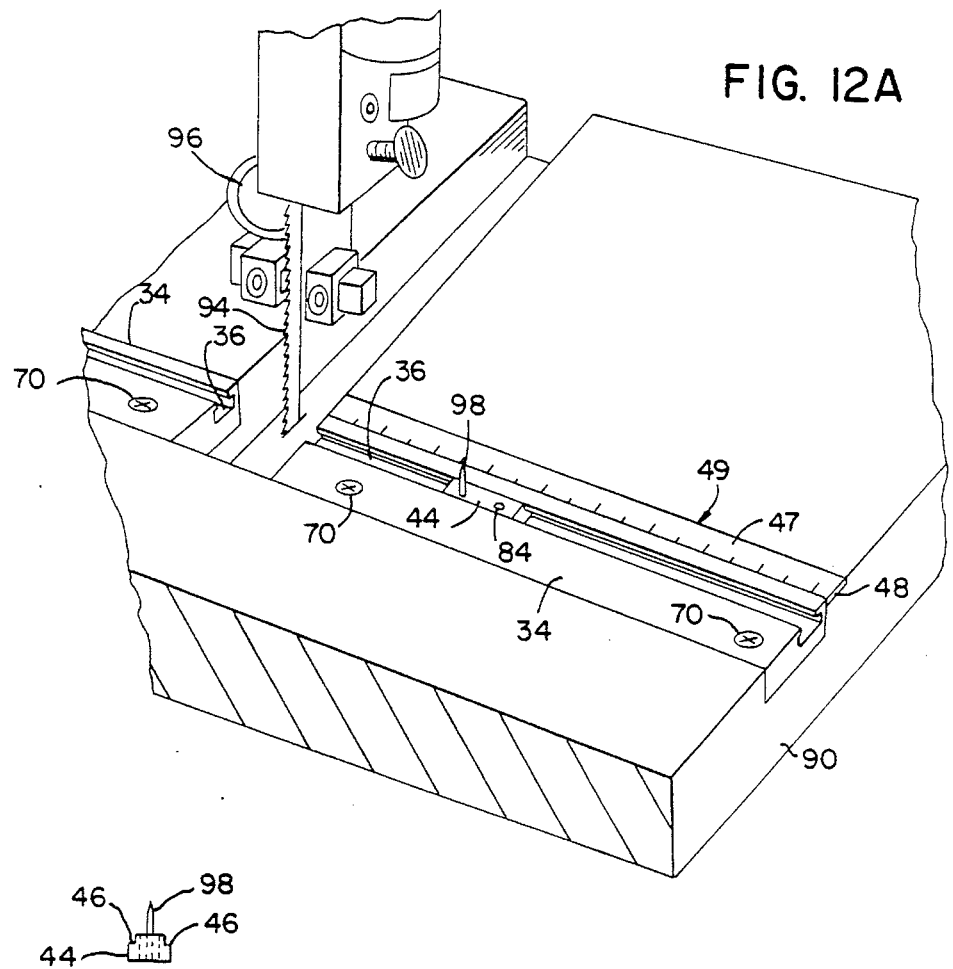
FIG. 12A
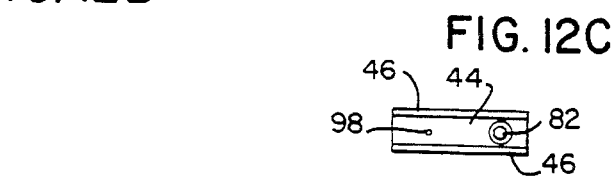
FIG. 12B
FIG. 12C
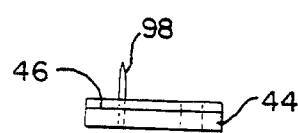
FIG. 12D
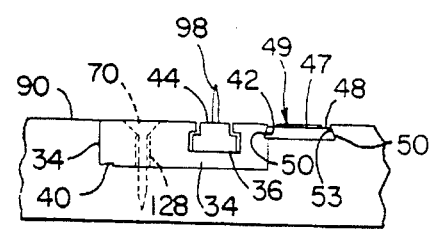
FIG. 12E

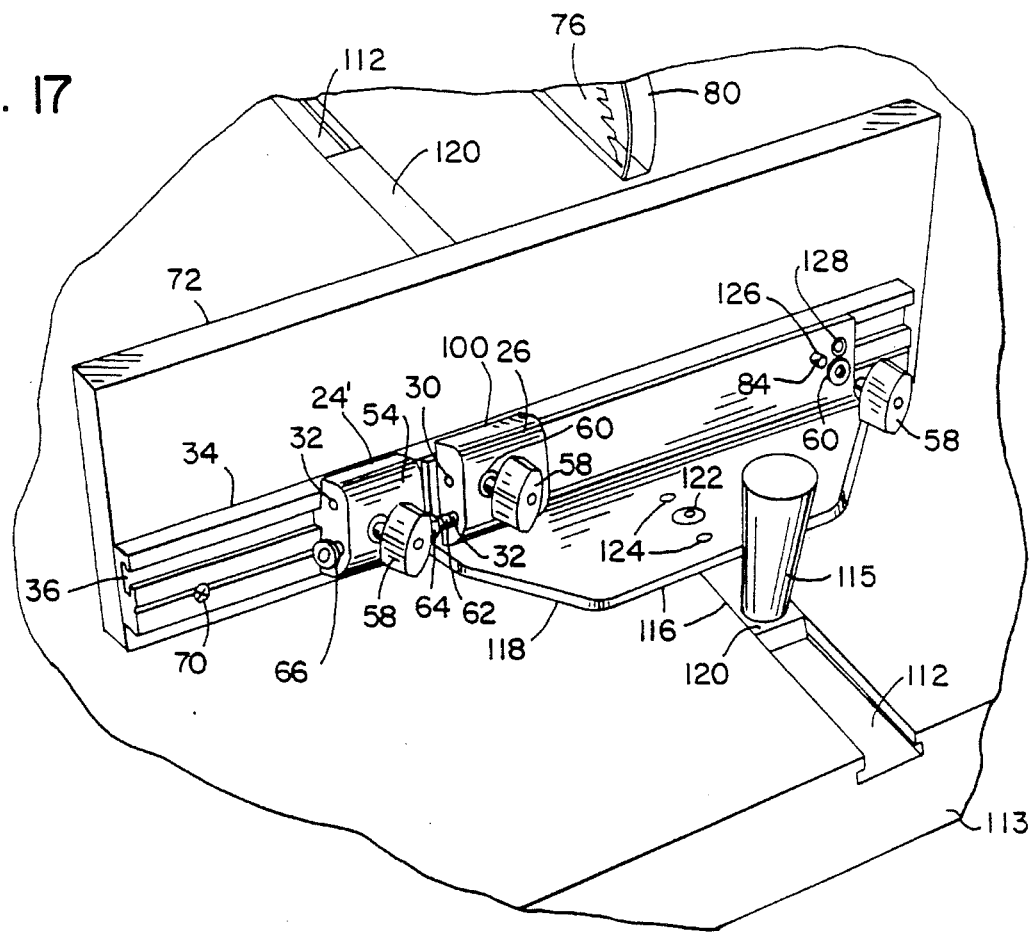
FIG. 17
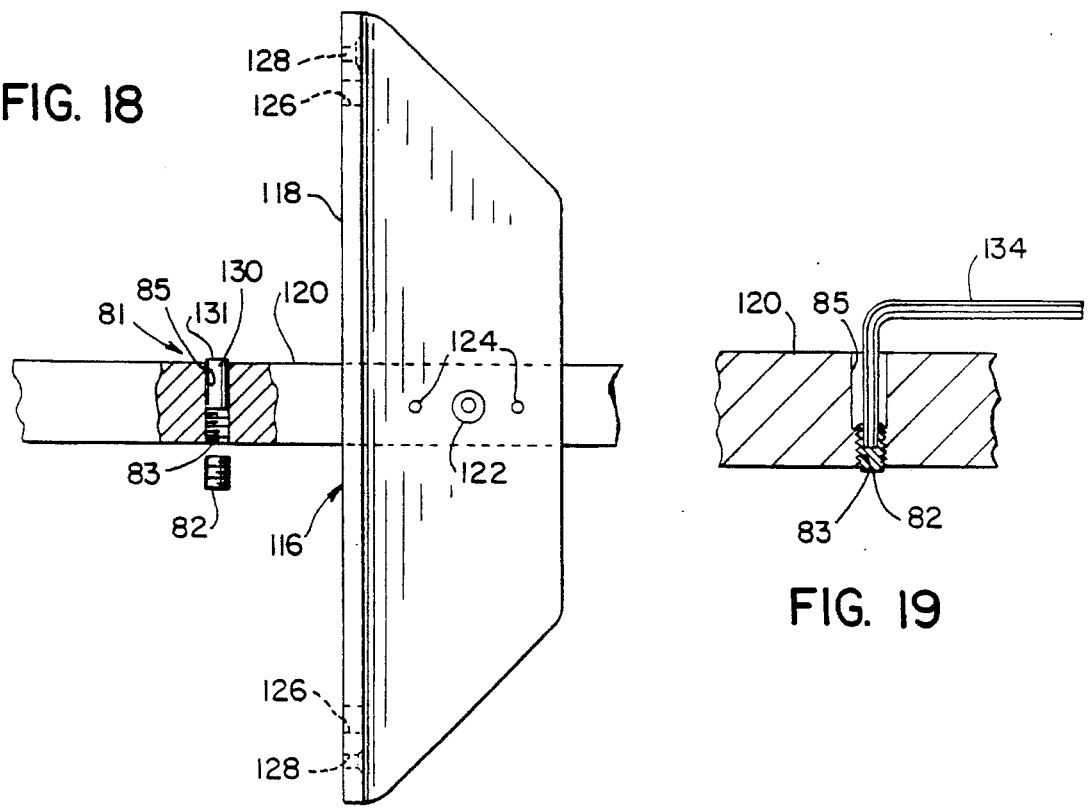
FIG. 18
FIG. 19

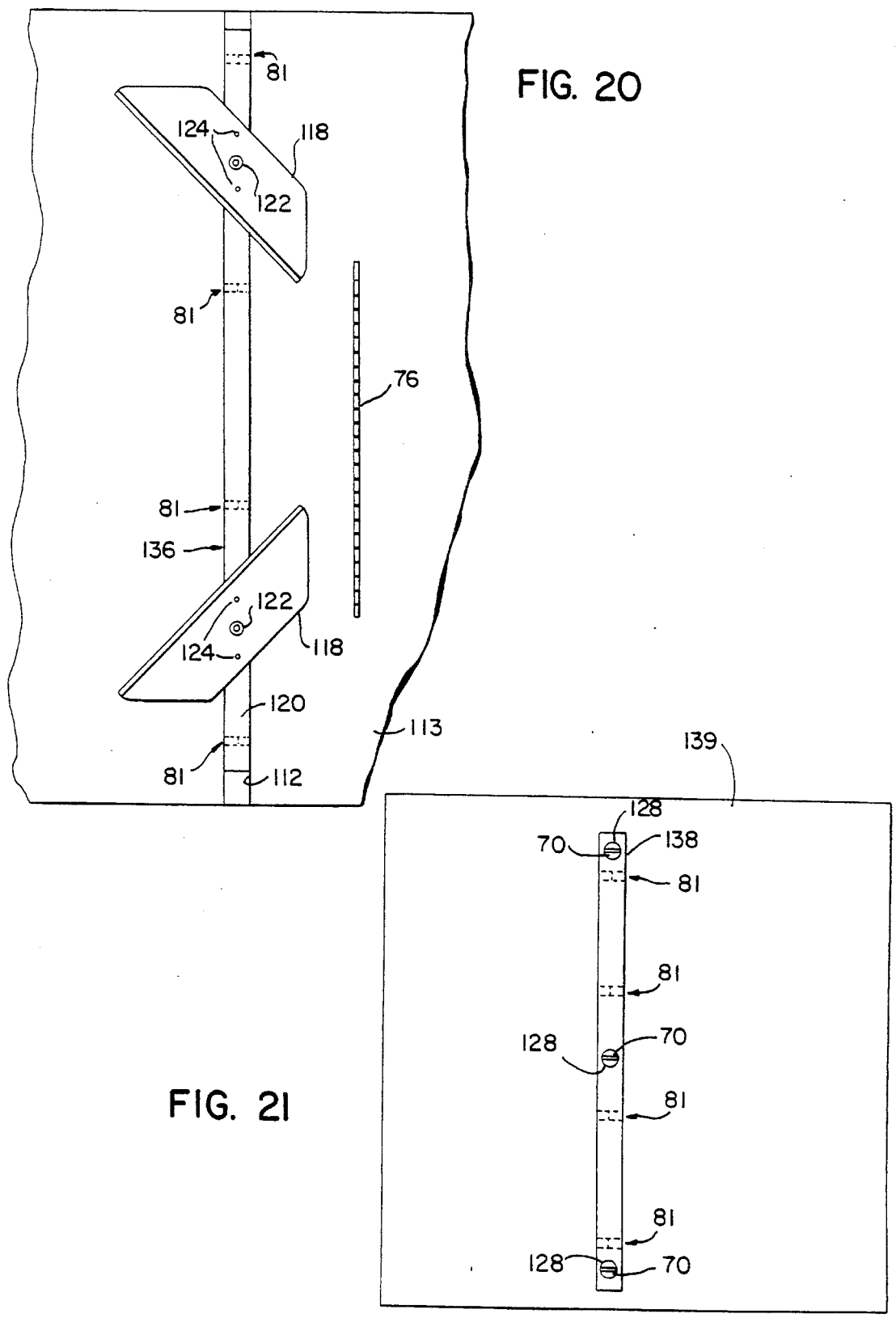

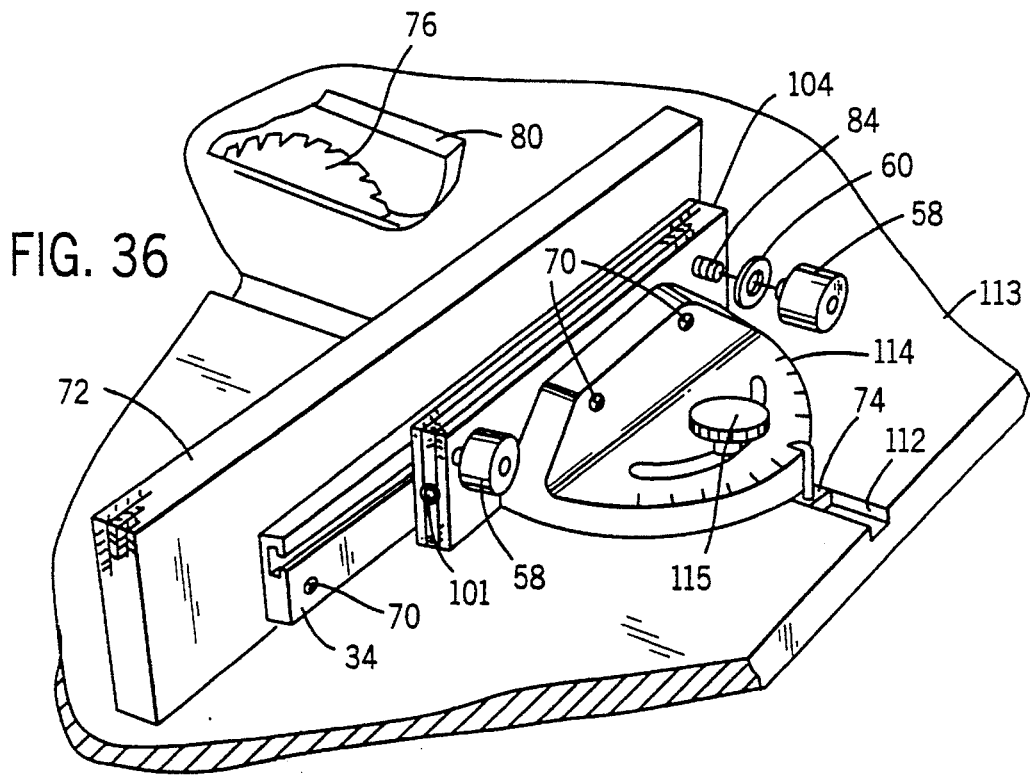
FIG. 36
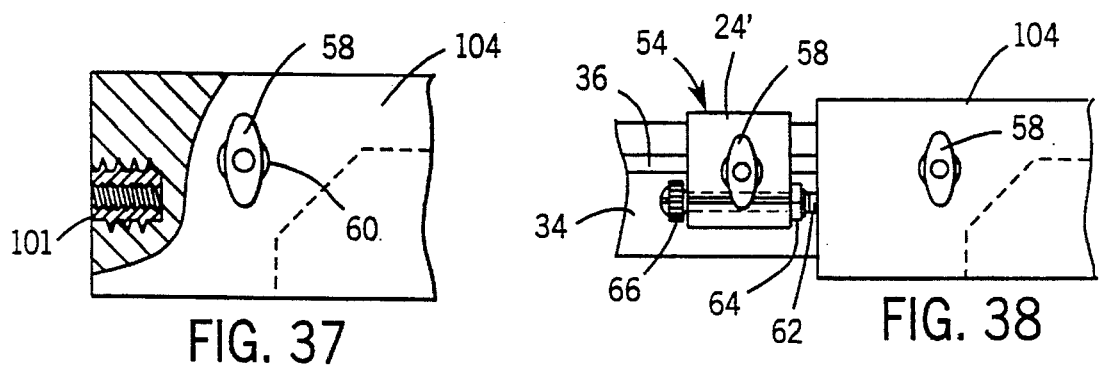
FIG. 37
FIG. 38
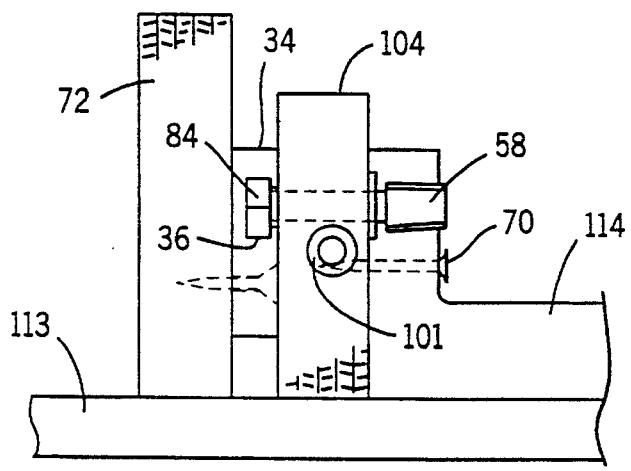
FIG. 39

5,617,909

WOODWORKING MACHINERY JIG AND FIXTURE SYSTEM

This application is a continuation in part of prior U.S. patent application Ser. No. 07/944,867 filed Sep. 14, 1992, now U.S. Pat. No. 5,337,641.

FIELD OF THE INVENTION

This invention relates to jigs and fixtures for aligning, guiding and/or holding a workpiece on woodworking machinery during a woodworking operation.

BACKGROUND OF THE INVENTION

Woodworking machines utilize various means of positioning or securing a workpiece as it is cut, drilled or routed. As standard equipment a table saw normally has a rip fence for cuts parallel to the blade (ripping) and a miter gauge for cutting at an angle to the blade (crosscutting). The usual approach is to add a piece of plywood (or other wood board) to the table saw miter head, called an auxiliary fence, to provide a more stable surface to secure and control the workpiece. By cutting the excess material off the auxiliary fence, the workpiece is supported closely adjacent to the blade and there is less splintering and tear out at the edge of the cut when the blade breaks through the rear surface of the workpiece. An added benefit of this technique is that the operator knows that the end of the auxiliary fence adjacent to the blade is the cut line of the saw blade.

When cutting multiple pieces a small block of wood is often clamped to the auxiliary fence and is used to measure the distance between the distal end of the workpiece (opposite the saw cut) and the blade. Workpieces of identical lengths can then be cut. Some table saws are fitted with an aluminum extrusion which increases the surface area of the miter head and a metal flip stop is adjustably secured to the extrusion that flips out of the way when it is not in use. This is an improvement over the idea of clamping a piece of wood in place because the flip stop can be flipped out of the way when not in use and replaced instantly (by flipping it down to engage the workpiece) at exactly the same setting.

The radial arm saw utilizes a wood fence to position a workpiece in relationship to the blade. As with the table saw, a stop block is often clamped to the fence to measure the distance between the blade and the end of the board when cutting multiple pieces to exactly the same length. This technique eliminates the tedious task of lining up a mark on the workpiece with the saw blade. In addition, it is an advantage to have the fence be wood so that if the fence is repositioned relative to the blade, the blade can simply make a new cut through the fence, which decreases splintering and lets the operator know exactly where the cut line is. If the fence is moved away from the blade, a new longer fence can be provided and cut, since the wood material of the fence is inexpensive.

As standard equipment, miter saws usually have a small metal fence with holes so that a wood fence can easily be screwed to it to provide support similar to the wooden radial arm saw fence.

Drill press tables and router tables are usually quite small so that it is desirable and common to make a larger auxiliary table with scrap plywood being the material of choice because of its cost, dimensional stability and resistance to warp.

Shop made jigs and fixtures are made to hold and position a workpiece during cutting, drilling or routing operations. These jigs are usually made out of scrap wood with plywood being the material of choice.

Aftermarket woodworking accessories have also become very popular. These accessories are designed to replace the standard miter gauge on the table saw or the wood fence which is standard on the radial arm saw. Some of the accessories for portable miter saws are the same as those used on the radial arm saw. Another group of accessories is used on the router table and the drill press. However, there has been no jig, fixture or fence system that can be used on the table saw, band saw, radial arm saw, miter saw, router table, drill press and for shop made jigs and fixtures. Because none of the present systems are compatible with each other, the flip stop for a radial saw system will not fit the table saw, router table or drill press. This causes expensive duplication of equipment to equip all the various types of woodworking machinery with fixturing.

Replacement table saw miter gauges, radial arm saw and miter saw fences are known which are made with an aluminum extrusion to which the flip stop is attached. Problems arise because the metal of the fence or miter extension should not touch the saw blade. Therefore, the workpiece is not supported next to the saw blade with these known systems, creating tear out or splintering of the workpiece when the blade breaks through the rear surface. The operator is forced to align the mark on the workpiece with the blade rather than with the edge of the wood fence. When making mating angled cuts, the known aftermarket radial and miter saw fences must be reset so that the blade does not cut through the extrusion when the fence is moved from one side of the blade to the other.

High quality woodworking requires the ability to work in very close tolerances, preferably 0.004". Although some rip fences on table saws have adjusters for making fine adjustments, there is no system available with a microadjuster for moving a flip stop, miter gauge jig and/or fixture, or a fence on a table saw, router table, drill press or similar table. There are aftermarket fences available that move a fence in increments of 1/32 of an inch, which is too course for many high quality woodworking operations.

Flip stops that are currently available are not amenable to precise machine set ups. The stops are either stamped or cast and often deflect with pressure. None of the stops lock in place, so a sharp point, such as a 45 degree miter on the supported end of a workpiece, can slide behind the stop and move it forward, defeating its purpose. There is also no convenient means of quickly attaching an accessory which, for example, would extend the stop forwardly to abut an angled board which would otherwise slide past the front of the stop.

It is also sometimes desirable to provide a stop which is reversible, allowing it to be locked in place in the reversed position and thus be the platform for other accessories such as a fast action clamp which is often used for shop made jigs and fixtures. It is also useful to provide a double stop design which allows two closely spaced stop positions when crosscutting boards to length with the stop farthest from the blade functioning as the rough stop and the stop positioned nearest the blade acting as the finish stop.

Known jig and fixture systems for radial and miter saws have typically been different from systems for table saws, and from systems for drill presses and router tables so that the components of the systems could usually not easily be used interchangeably. In addition it was difficult to adapt them to be used with shop made jigs and fixtures.

A ruler is used on some of the aftermarket jig and fixture products to facilitate measuring when performing a cutting operation. There are self-adhesive rulers available but once these are stuck in place they are hard if not impossible to move. There is no mechanism for easily attaching a ruler to a shop made jig or fixture which allows a ruler to be moveable. It is desirable to provide a moveable ruler so that the jig can be "zeroed out" for different sized saw blades, router bits or drill bits.

Aftermarket table saw miter gauges are in general bigger and heavier versions of standard adjustable miter gauges, but in principle operate the same. Known miter gauges often have a guide bar which fits loosely in the table slot so that there is excessive play or "wiggle" of the bar in the slot. Some currently available guide bars are designed so that the bar is split with a slot and a screw expands the bar in the area of the slot. This design bulges the bar at one or two expansion points. The bar often wiggles in the slot when it is retracted for cutting a wide workpiece and the deformed bar makes it impossible to accurately square the miter head or jig and/or fixture against the bulged out side of the miter guide bar because that surface of the bar is not straight. There also is no lubrication provided in the currently available miter gauge bars or jig bars, requiring external lubrication.

SUMMARY OF THE INVENTION

The invention provides an improved system for making jigs and/or fixtures in a woodworking shop, and which can be used to enhance wood fences and wood tables of woodworking machinery such as table saws, band saws, radial arm saws, miter saws, drill presses and router tables. A woodworking machinery jig and fixture system of the invention has a section of track with a longitudinal guide for releasably mounting accessories to the track. The accessories are slidable longitudinally along the guide and the track has means for fixing it to a separate woodworking support. Thereby, the system is readily adaptable to many different applications and woodworking machines.

In an especially useful form, the microadjuster is slidably mounted to the track to enable making gross adjustments in the position of a fence relative to a table and has an adjustment screw which can be used to make fine adjustments in the position of the fence relative to the table. This aspect may be applied to either a fence of a miter gauge, for example of a table saw, or to a fixed fence, for example of a drill press or router table.

The track can preferably be mounted on a woodworking support which is made of wood and typically be either a table or a fence. The woodworking support is preferably made of wood so as to support a workpiece closely adjacent to a tool so as to reduce splintering and tear out during a woodworking operation, provide greater accuracy and ease of measurement in making a cut, and be readily provided and replaced by a user of the system with ordinary shop materials.

In another aspect, a woodworking machinery guide such as a miter guide has a workpiece support and a guide bar secured to the workpiece support for sliding in a slot of a woodworking machinery table. The guide bar has opposed sides and an anti-play feature in which a bore extends from one side of the bar to the other, a bearing is received in the bore, and a set screw is received in the bore so that tightening the set screw causes the set screw to bear against one end of the bearing so as to exert pressure against a side of the slot in the woodworking machinery table at the other end of the bearing. This eliminates wobble of the guide bar in the slot so as to improve the accuracy of cuts made using miter bar type guides. For even greater accuracy, the head of a miter guide is at a fixed angle relative to the bar, for the most common cuts, either 90° or 45°.

In a preferred woodworking machinery guideway for the system, an elongated longitudinal flexible channel has a generally U-shaped lateral cross-section with a bottom wall, two laterally spaced apart side walls and an open top. The lower surface of the bottom wall is raised at its lateral center relative to side edges of the lower surface. The bottom wall has at least one hole therethrough for insertion of a threaded fastener to secure the guideway to a woodworking machinery support so that as the fastener is tightened the bottom wall is flexed downwardly. Such flexing downwardly reduces the lateral spacing between the side walls, which eliminates excess space between the guide and a miter bar in the guide to create a sliding fit without wobble.

Other objects and advantages of the invention will be apparent from the following detailed description of the preferred embodiments and from the drawings.

BRIEF DESCRIPTION OF THE DRAWINGS

FIG. 12A is a perspective view of a system of the invention in which a circle jig point is mounted in a track on a band saw auxiliary table;

FIG. 12B is an end elevation view of the circle jig point for the system of FIG. 12A;

FIG. 12C is a top plan view of the circle jig point;

FIG. 12D is an side elevation view of the circle jig point;

FIG. 12E is a detail view of a portion of FIG. 12A;

FIG. 17 is a perspective view of a miter mount system similar to the system of FIGS. 15A–C but incorporated in a 90° fixed angle miter gauge;

FIG. 18 is an enlarged top view of a preferred form of 90° fixed angle miter gauge with a portion broken away to illustrate an anti-play feature of the miter gauge;

FIG. 19 is a top fragmentary view of the miter bar of FIG. 18 shown with the set screw reversed from its orientation show in FIG. 18;

FIG. 20 is a top fragmentary view of a double fixed 45° miter gauge incorporating an anti-play feature as illustrated in FIGS. 18 and 19;

FIG. 21 is a top view of a miter gauge bar with an antiplay feature as shown in detail in FIG. 18 mounted to a piece of plywood;

FIG. 36 is a view similar to FIG. 15A but showing an alternate construction;

FIG. 37 is a view similar to FIG. 15B but showing the construction of FIG. 36;

FIG. 38 is a view similar to FIG. 15C but showing the construction of FIG. 36;

FIG. 39 is a view similar to FIG. 16 but showing the construction of FIG. 36;

DETAILED DESCRIPTION OF THE PREFERRED EMBODIMENTS

Figure 1A:
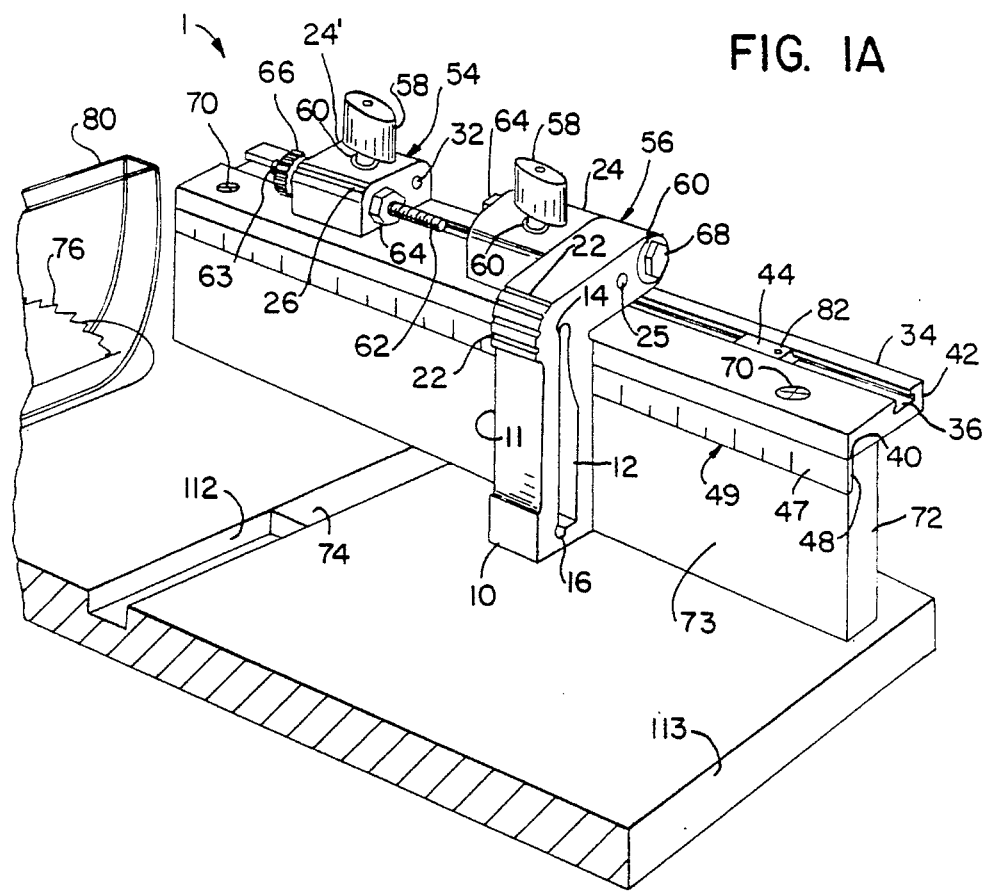
FIG. 1A is a perspective view of a woodworking jig and fixture system of the invention applied to a table saw.
Figure 2:
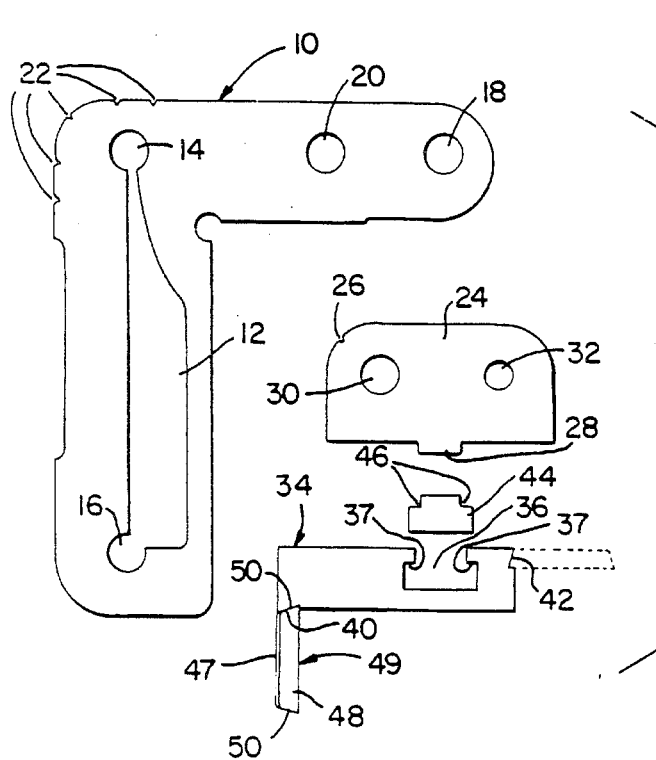
FIG. 2 is an end elevation view of certain components of the system of FIG. 1A.
Figure 1B:
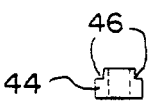
FIG. 1B is an end elevation view of a location stop for the system of FIG. 1A.

Referring to FIG. 1, a woodworking machinery jig and fixture system 1 of the invention is disclosed incorporated in a table saw having a table 113, a saw blade 76, a blade guard 80 and a miter guide slot 112 in the table 113. In well known fashion, a miter bar 74 having a rectangular cross-section fits in slot 112 and is slidable in the slot 112 in a direction parallel to the blade 76. Fixed at the right end of bar 74 (the end not shown in FIG. 1A) is a miter gauge head 114 (See, for example, FIG. 15A). The miter bar 74 and the miter gauge head 114 are standard equipment which is normally sold as part of a table saw.

Figure 15A:
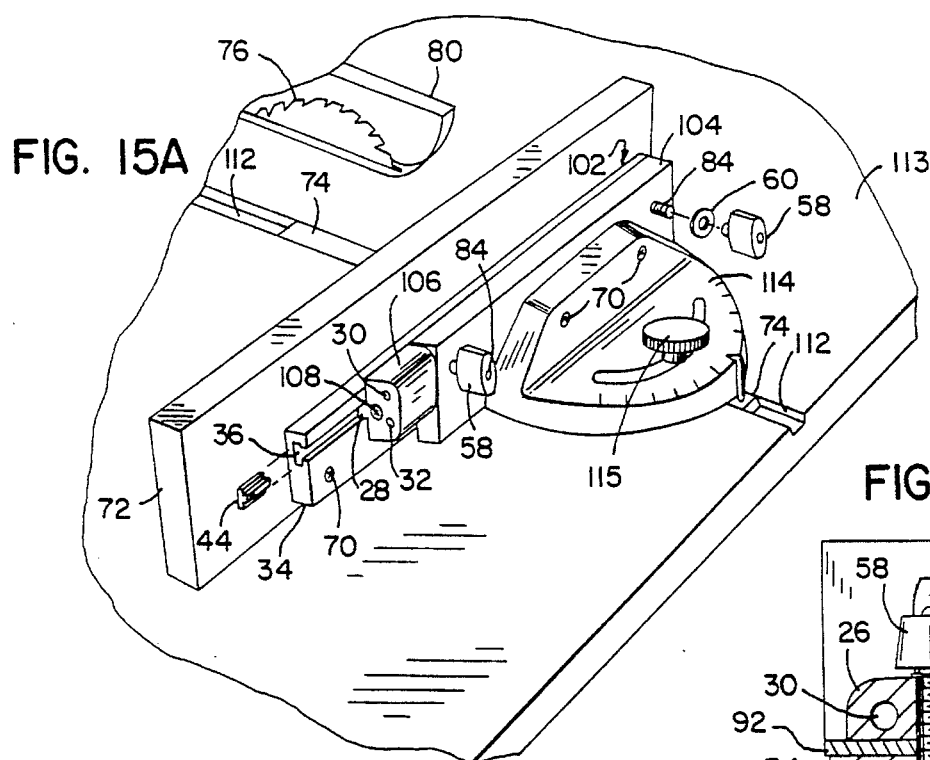
FIG. 15A is a perspective view of a system of the invention mounted to a miter gauge head.

It has been common practice in woodworking with a table saw to attach a piece of wood 72, such as a piece of plywood, to the miter gauge head 114 (such as with screws 70 shown in FIG. 15A). In the art, the piece of wood 72 is sometimes referred to as an auxiliary fence. The auxiliary fence 72 may be attached to the miter gauge head 114 in any suitable way, for example with its rear face 71 in direct abutment with the front face of the head 114 or in the manner shown in FIG. 15A, described below. The miter bar 74 and gauge head 114 are not shown in FIGS. 3, 4, 5, 6, 8 and 9 for simplicity and clarity, it being understood that in use the fence 72 would be attached to the miter bar 74/gauge head 114 assembly.

In well known fashion, a workpiece (not shown) to be cut with the table saw is placed against the front face 73 of the auxiliary fence 72, the miter head 114 is adjusted to the desired angle of cut and the workpiece is cut at the desired location along the length of the workpiece by pushing the workpiece into the blade 76 using the miter head 114, the attached bar 74 and the auxiliary fence with the workpiece supported against the front surface 73. In so doing, it is desirable that the auxiliary fence 72 extends from the head 114 to being closely adjacent to the near side of the blade 76 so as to provide support to the workpiece closely proximate to the blade 76. This helps prevent chipping and splintering when the blade breaks through the rear surface of the workpiece.

In the system 1 shown in FIG. 1A, accessories as shown are added to a common auxiliary fence 72 (modified as described below to incorporate the components) so as to improve the guidance, stability and versatility of the common auxiliary fence. Referring also to FIGS. 2–6, components of the system 1 include a flip stop 10, a base 24 and a track 34. It is also desirable in many applications to provide a ruler 49, a location stop 44 and a microadjuster 54.

The flip stop 10, base 24, track 34 and location stop 44 are preferably cut as lengths from aluminum or aluminum alloy extrusions. One suitable material is 6105 T-6 aluminum alloy. It is also desirable that the ruler 49 include an aluminum or aluminum alloy extrusion 48 with a commercially available self-adhesive scale 47 applied to the front face thereof. The aluminum or aluminum alloy extrusions provide strength and dimensional stability so that the system is structurally sound and reliable and also economical to manufacture. However, the system components could also be made of other materials and by other processes, such as molded, extruded or pultruded plastic, by metal casting or metal extrusion of some metal other than aluminum, or of any other suitable material made by any suitable process.

A flip stop assembly 56 includes a L-shaped flip stop 10 which is pivotally attached to a base 24 by a pivot pin 68, which is preferably a 2½" long ¼" diameter bolt, so that the stop 10 is pivotable relative to the base 24 about the longitudinal axis of the bolt 68. Referring particularly to FIGS. 1–4, the bolt 68 extends through hole 18 of stop 10 and through hole 30 of base 24. The shank end of bolt 68 extends beyond hole 30 and is secured by a lock nut 64, preferably of the type having a plastic friction insert to resist rotation of the nut relative to the bolt. Brass washers 60 preferably separate the head of bolt 68 from stop 10, stop 10 from base 24 and nut 64 from base 24, so as to provide bearing surfaces when the stop 10 is pivoted relative to the base 24. Nut 64 is torqued so that the stop 24 is fixed to the base 24 so as to allow no relative movement between the stop 10 and the base 24 other than pivoting. In making stop 10 as a cut section of an extrusion, it is desirable to form recess 12 therein so as to facilitate forming holes 14 and 16 and save material in the extrusion process, as is well-known in the aluminum extrusion art.

The flip stop assembly 56 is used to crosscut workpieces to length by measuring the distance between the end of the workpiece, which is butted up against the blade side 11 of the stop 10, and the saw blade 76. With the stop 10 in the work position shown in FIG. 1A, the end of a workpiece board (not shown) is pressed against side 11 of the stop 10 while the other end of the board is cut with the blade 76. When the stop 10 is not in use, it is flipped up out of the way to a standby position, such as to the phantom position shown in FIG. 4A, so that a workpiece board can be slid along the face 73 of fence 72 without interfering with the stop 10. Preferably, grooves 22 are provided at the corner of stop 10 to provide a finger grip for facile pivoting of the stop 10.

Figure 4A:
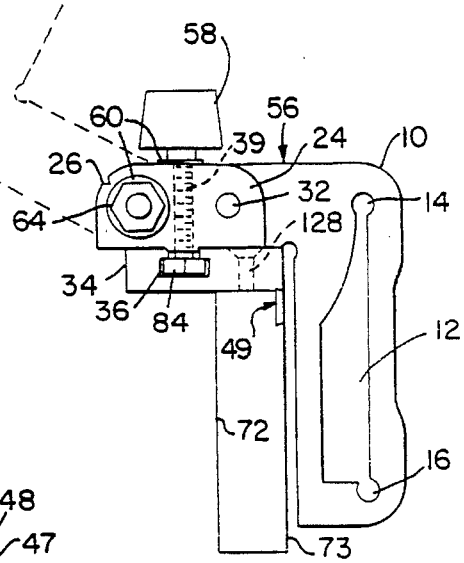
FIG. 4A is an end elevation view of the system of FIG. 1A as viewed from the left end (as viewed in FIG. 1A) and with the microadjuster shown in FIG. 1A removed.
Figure 4B:
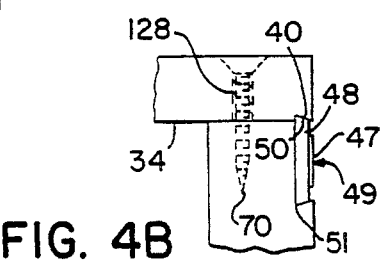
FIG. 4B is a detail view of a portion of FIG. 4A.
Figure 5:
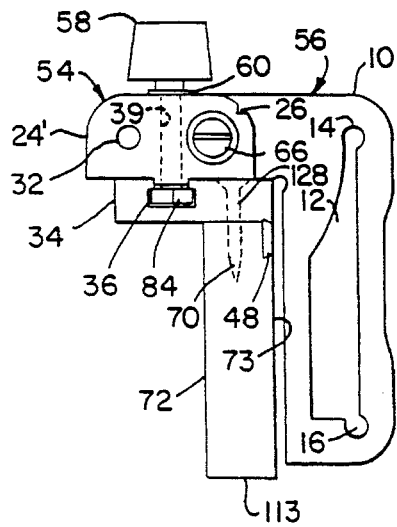
FIG. 5 is an end elevation view similar to FIG. 4A but showing a microadjuster installed in the system.
Figure 6:
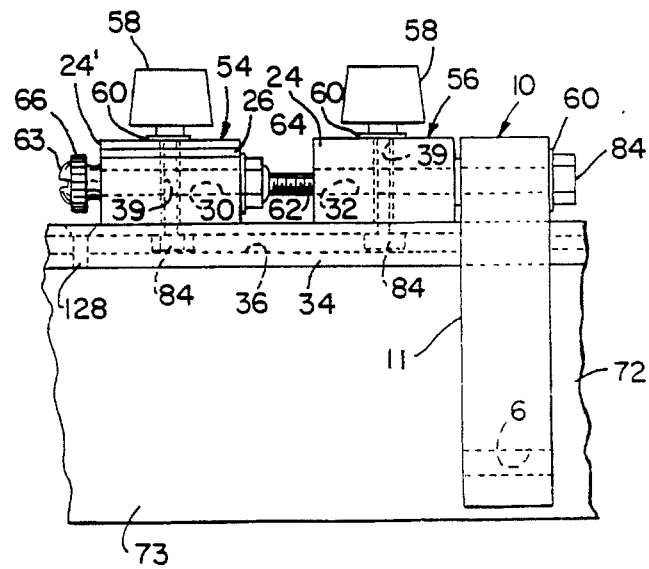
FIG. 6 is a front plan view of the system showing a microadjuster threaded into a flip stop.

The base 24 is secured to track 34 so as to be slidable along the length of the track 34. Referring particularly to FIG. 4A, the track has a guide 36 on its top surface which is a longitudinal T-shaped slot. The head of a 1¼" long ¼-20 bolt 84 is captured in the slot 36 so that shoulders 37 engage the shank side of the head of bolt 84 and the bolt 84 extends upwardly from the open slot 36 through a central hole 39 in the base 24 and is threaded into knob 58, which can be loosened to slide the flip stop assembly 56 along track 34 and tightened to secure the position of the flip stop assembly 56 on the track 34. Preferably, a brass washer 60 resides between knob 58 and the base 24. The base 24 has a protrusion 28 which extends longitudinally along the bottom of the base 24 which fits in the top of the slot 36 to help guide the base 24 and prevent it from rotating relative to the track 34.

The track 34 is secured to the top of the auxiliary fence 72 by drywall screws 70 (FIGS. 1 and 4) which extend through chamfered holes 128 in the track 36 and are screwed into the plywood auxiliary fence 72. The track 34 has an angled indentation 40 which runs longitudinally so as to capture the edge of ruler 49. Preferably, the angle of the indentation 40 is 14° and the angle of the mating edge of the ruler extrusion 48 is the same or slightly larger (e.g., 15°) because 14° is the angle of a standard dovetail router bit. The opposite side of the ruler extrusion 48 is also preferably formed with a 14° or 15° angle. A user of the system 1 then need only route one 14° edge in the fence 72 to receive the lower edge of the ruler 49 (as viewed in FIG. 1A). Screwing the track 34 to the fence 72 will then capture the ruler 49 between the angled edge 42 of the track and the routed edge of the fence 72. A similar angled edge 42 may be provided on the track 34 so that the ruler may be installed parallel to the top of the track 34, as shown, for example in FIG. 12A.

Figure 3:
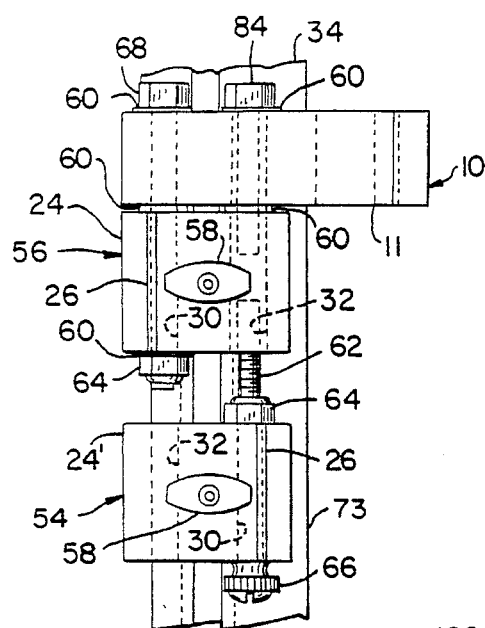
FIG. 3 is a top plan view of the system of FIG. 1A shown with a microadjuster threaded into the flip stop and the flip stop locked against pivoting.

The flip stop assembly 56 is moved in small increments relative to the track 34 with a microadjuster 54 which includes a base 24' and a brass bolt 62 with a brass knurled knob 66 glued to the bolt 62 at one end of the base 24' and a lock nut 64 at the other end of the base 24'. The base 24' of the microadjuster 54 is identical to the base 24 of the flip stop assembly 56. However, when the system 1 is assembled, the base 24' is rotated in position 180° from the position of the base 24 as viewed in the top view (FIG. 3). The bolt 62 extends through hole 30 of base 24' and knob 66 and nut 64 at opposite ends of base 24' secure the bolt 62 against longitudinal movement relative to the base 24'. The bolt 62 can be rotated relative to the base 24' because hole 30 is not threaded and is slightly larger in diameter than bolt 62. Bolt 62 extends into hole 32 in base 24 of the flip stop assembly 56, which is threaded to mate with the threads of bolt 62 and axially aligned with hole 30 of base 24'. The microadjuster 54 is adjustably secured to the track 34 with a plastic knob 58 and bolt 84 captured in slot 36 in the same way as the flip stop assembly 56.

To make fine adjustments in the position of the flip stop assembly 56, the knob 58 of the flip stop assembly 56 is loosened so as to allow sliding the flip stop assembly 56 longitudinally relative to the track 34. However, the knob 58 of the microadjuster 54 is left tight so the microadjuster 54 stays secured in position on the track 34. The bolt 62 is then turned using knurled knob 66, which moves the flip stop assembly 56 toward or away from the microadjuster 54, depending upon which way the bolt 62 is turned, as the bolt 62 threads into or out of the hole 32. When the desired position of the flip stop assembly 56 is reached, the knob 58 of the flip stop assembly 56 may be retightened.

Figure 7:
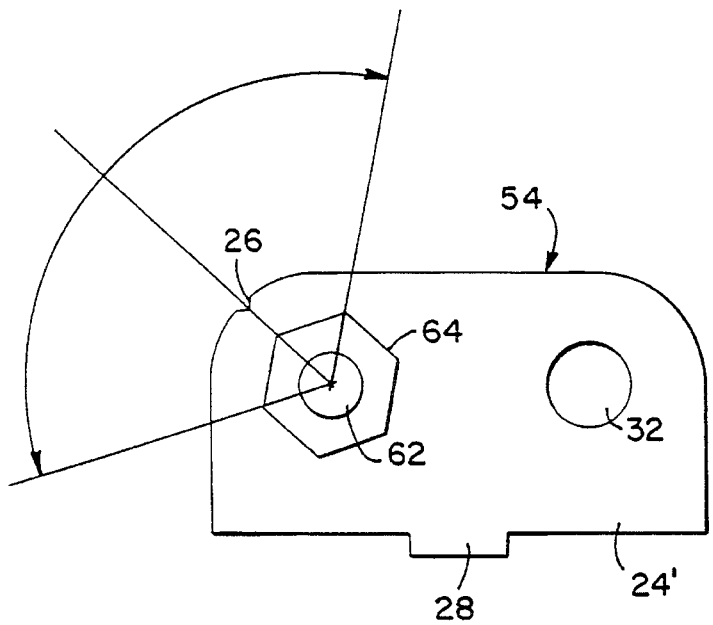
FIG. 7 is an end elevation view of a microadjuster illustrating how the microadjuster can be used for measuring fine adjustments.

A longitudinal groove 26 in the base 24' of the microadjuster 54 can be aligned with successive corners of the lock nut 64 on bolt 62 to measure and calibrate the movement of the flip stop assembly 56 as the bolt 62 is turned, as graphically illustrated in FIG. 7. Using ¼-20 threads on the bolt 62 and in the hole 32, the flip stop assembly 56 would traverse approximately 0.008" as the bolt 62 is turned from a position in which one corner of the nut 64 is aligned with the groove 26 to a position in which the next corner is aligned with the groove 26. One complete revolution of the bolt 62 therefore results in the flip stop assembly 56 moving approximately 0.050". The exact distance between the saw blade 76 and the flip stop assembly 56 can be measured with the ruler 49.

Figure 1C:
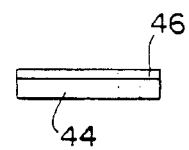
FIG. 1C is an side elevation view of the location stop.
Figure 1D:
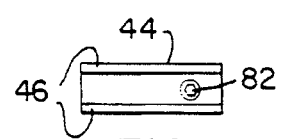
FIG. 1D is a top plan view of the location stop.

With the system shown in FIG. 1A, the microadjuster 54 may or may not be used, but in either event the flip stop assembly 56 can be used to position a workpiece relative to the blade 76. Should the position of the microadjuster 54 or of the flip stop assembly 56 be desired to be "memorized" so as to later return to that position, a location stop 44 with indented corners 46 fits into the track slot 36, is slid to the position desired to be memorized, and is locked there with a set screw 82 (FIG. 1C).

At times it may be desirable to lock the flip stop 10 in the down position, for example, if the workpiece has an angled end which tends to wedge behind the stop 10 and lift it to a pivoted position. To secure the stop 10 down, a bolt 84 may be inserted through hole 20 in stop 10 and threaded into threaded hole 32 of base 24, as shown in FIG. 3.

Figure 8:
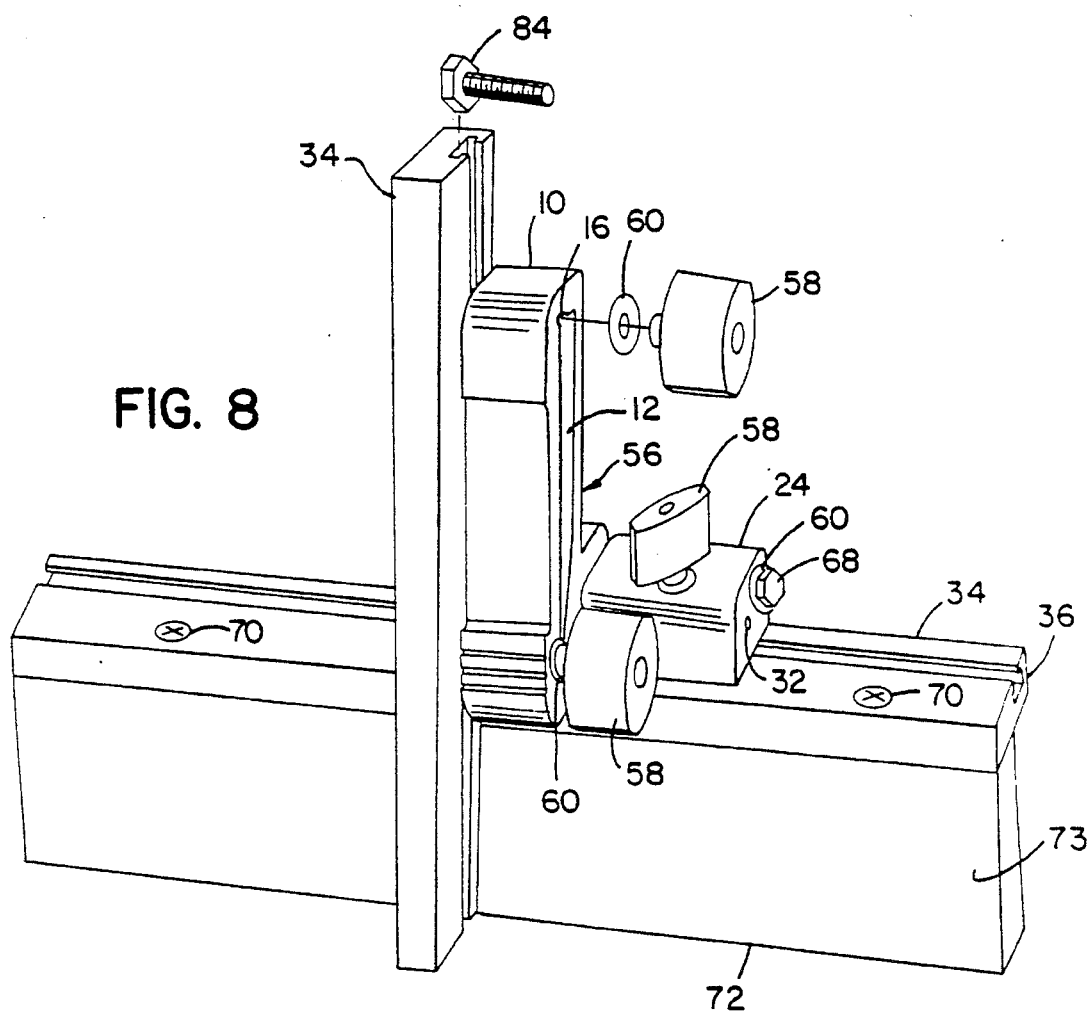
FIG. 8 is a perspective view of a system having a flip stop reversed from the position shown in FIG. 1A and a track bolted to the flip stop.
Figure 9:
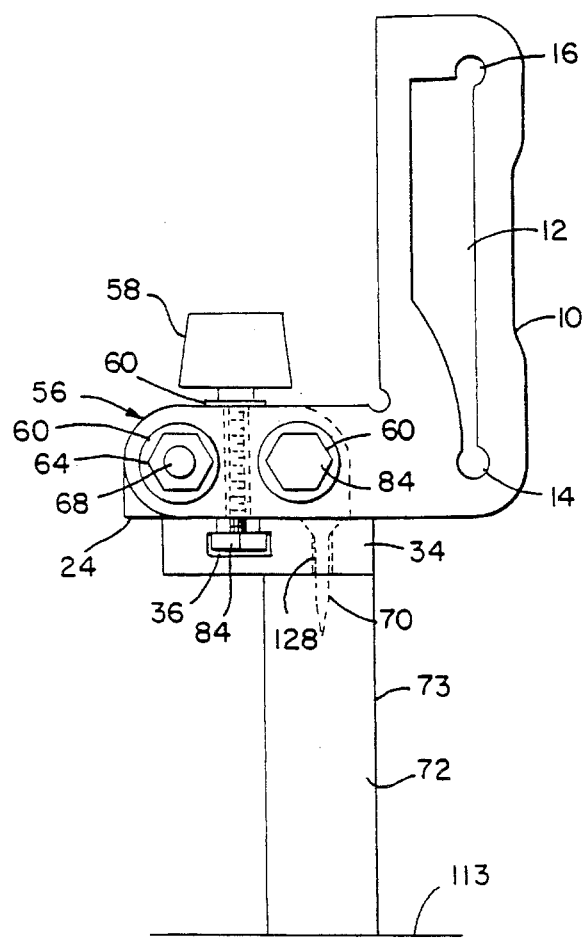
FIG. 9 is an end elevation view of a flip stop in the reversed position and locked in place with a bolt.

FIGS. 8 and 9 show a configuration of the flip stop assembly 56 having the flip stop 10 rotated vertically 180 degrees so that it is pointing in the direction away from the track 34 rather than toward it. This configuration is useful for machines which may require a fence which is not as tall as the flip stop 10, for example, some radial arm saws, or where other accessories are desired to be secured to the flip stop 10. In this position the flip stop 10 can still be flipped out of the way or alternately locked in place with a bolt 84 through the flip stop 10 and threaded into the tapped hole 32 in the base 24 of the flip stop assembly 56 as further described respecting FIG. 3 and as is shown in FIG. 9. A piece of wood may be secured to the flip stop 10 with appropriate fasteners through holes 14 and 16 in the stop 10 to extend stop 10 down to the table, or a piece of track 34 can be secured to the flip stop 10 with bolts 84 (trapped in slot 36 as discussed above), washers 60 and knobs 58. By screwing a piece of track 34 to jigs, fixtures, holddowns or other accessories, the accessories can be quickly changed or repositioned and securely locked in place on the flip stop 10 with a bolt 84, brass washer 60 and knob 58.

In addition, a flip stop 10 could be pivotally attached on each side of the base 24 by simply using a longer bolt 68. Such an arrangement is useful, for example, when first making a rough cut and then a finish cut, or when squaring the ends of a workpiece. The procedure would be to make the first cut using the stop furthest away from the blade, with the stop which is closer to the blade in the standby position, and to then flip the closer stop down into the work position to make the second cut.

Figure 10:
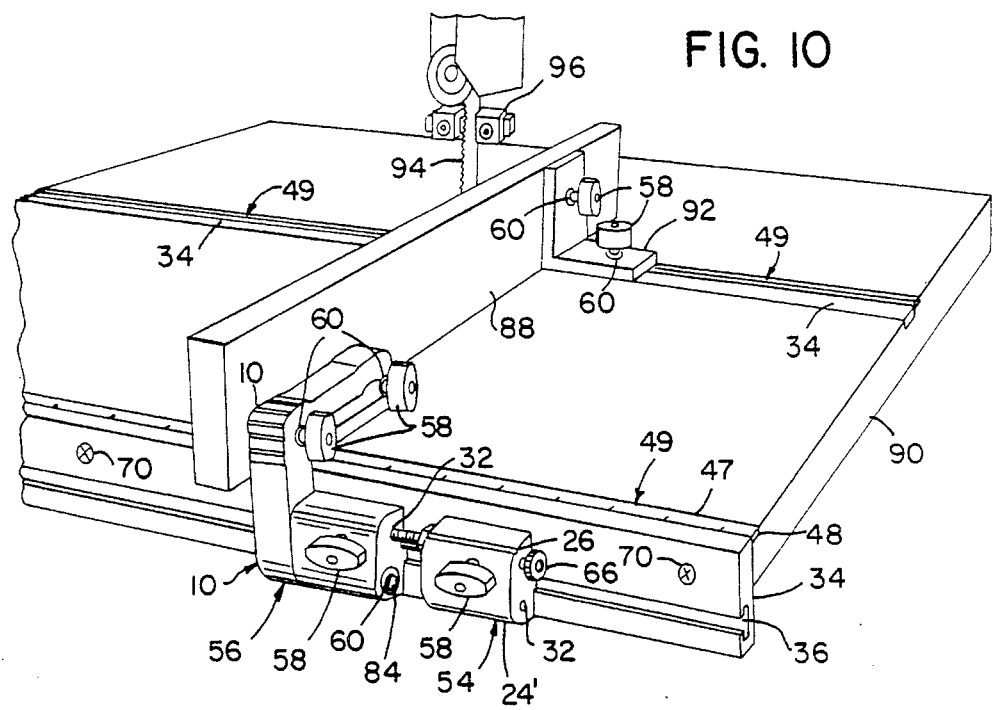
FIG. 10 is a perspective view of a system of the invention shown securing a fence on a band saw auxiliary table.
Figure 11A:
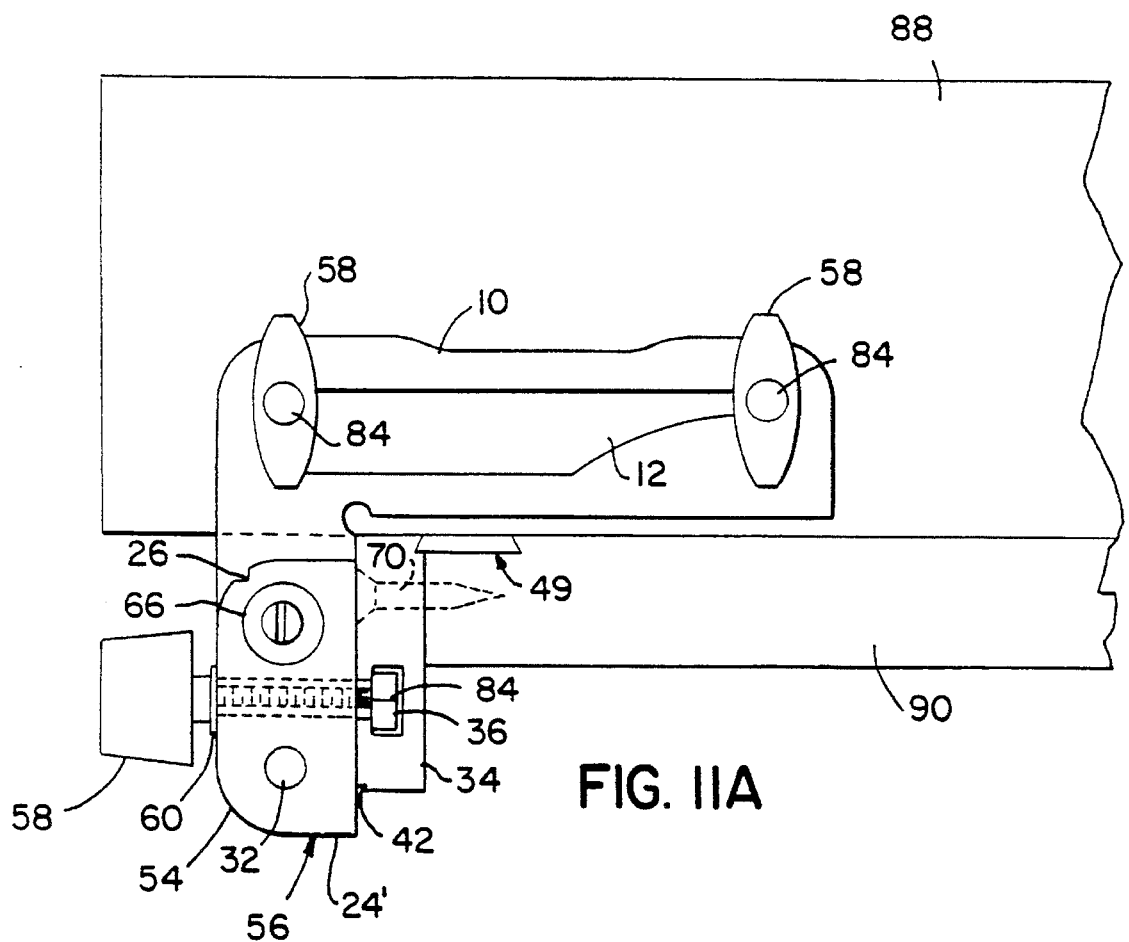
FIG. 11A is an end elevation view of a portion of the system shown in FIG. 10.
Figure 11B:
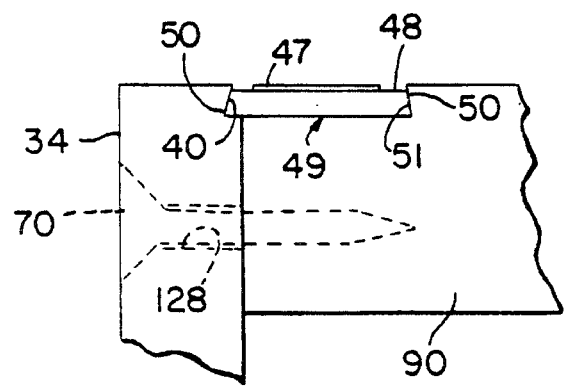
FIG. 11B is a detail view of a portion of FIG. 11A.

FIGS. 10, 11A and 11b illustrate an application of a system of the invention to a band saw. The band saw has a narrow blade 94 which has teeth on the front and a guide assembly 96 which prevents the sideways and backward movement of the blade. The workpiece can be rotated around the narrow band saw blade 94 creating a curve. Because the standard cast iron or aluminum table of a band saw is usually small, a larger auxiliary plywood table 90 is often added to support large workpieces. A rip fence 88 is used to feed wood into the blade 94 so that the direction of feed is parallel to the fence 88. Ideally, the fence 88 should move laterally to vary the distance between it and the blade 94 and stay parallel to the blade 94.

In this application, a piece of track 34 is screwed to the edge of the auxiliary table 90 and attaches the fence 88 to a flip stop assembly 56 which is preferably locked in the down position with a bolt 84 (not shown in FIG. 10) extending through the stop 10 and threaded into hole 32 in base 24 in the manner shown in FIG. 3. Whereas in the table saw application shown in FIG. 1A, the auxiliary fence 72 is the woodworking support to which the track 34 is fixed, in the band saw application in FIG. 10 the woodworking support is the table 90 to which the track 34 is affixed. As used herein, a support is a structure which is perpendicular or at an angle to the feed direction and is used to set the angle of cut and a stop is a structure which is parallel to the feed direction, or if at an angle to the feed direction, is used to set the length of the cut workpiece.

In FIG. 10, the flip stop 10 can be screwed to the rip fence 88, bolted to the fence 88 and secured with washers 60 and knobs 58 as shown, or secured with other appropriate fasteners extending through the holes 14 and 16 of the stop 10. The rip fence 88 can be moved in small increments by using the microadjuster 54 to move the locked flip stop assembly 56. The movement of the rip fence 88 is easily calibrated with rulers 49, two of which are preferably provided in this application. The end of the fence 88 near the blade 94 is adjustably secured to the table 90 with a 90 degree angle bracket 92 adjustably mounted to a section of track 34 which is screwed to the table 90 flush with the table top surface near the blade 94 (See FIGS. 12A and 12B). The bracket 92 is adjustably mounted to the track 34 with a bolt 84 captured in slot 36, washer 60 and knob 58 in the manner that the bases 24 and 24' are adjustably mounted to track 34, described above with reference to FIGS. 3 and 4. The angle bracket 92 is secured to the fence 88 by any appropriate fastener, such as a bolt secured by a knob 58 as shown.

FIG. 11B illustrates in greater detail how the ruler 49 is secured by the longitudinal indent 40 of the track 34. The angled edges 50 of the ruler extrusion 48 are secured in the angled rabbet 51 at the corner of the band saw auxiliary table 90 and the angled indent 40 of the track 34. The ruler extrusion 48 is tightened in place by the drywall screws 70 which secure the track 34 to the band saw auxiliary table 90. The self-adhesive scale 47 is secured to the top of the ruler extrusion 48 to make the ruler 49.

Figure 25:
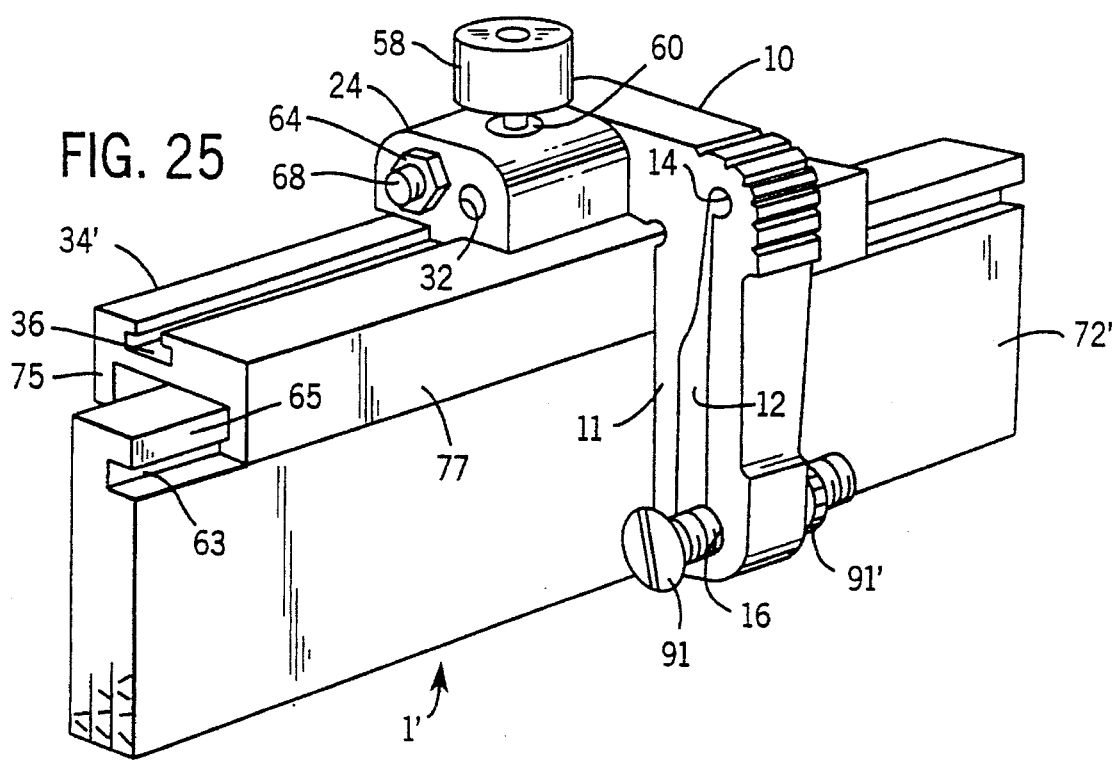
FIG. 25 is a perspective view of an alternative embodiment of a system of the invention.

FIG. 25 illustrates an alternate embodiment of a jig and fixture system of the invention. The system 1' shown in FIG. 25 is essentially the same as the system 1 shown in FIG. 1A, except for the substitution of the track 34' for the track 34, the absence of the ruler 49 and microadjuster 54, and an auxiliary fence 72' in place of the fence 72.

As illustrated in FIGS. 25–30, the track 34', which is also preferably an aluminum extrusion, has a slot 36, and the base 24 is slidably secured in the slot 36 in the same manner as in the case of the track 34. However, the attachment of the track 34' to the fence 72' differs from the attachments of the track 34 to the fence 72. The track 34' is secured to the fence 72' by a thumb screw 69 which is threaded through flange 75 of the track 34'. A flange 77 extends down from the main portion of the track 34' on the other side to form a slot on the underside of the track 34' between the flanges 75 and 77, in which the top of the auxiliary fence 72' is received. The flange 79 has an inward extension 61 which forms an undercut shoulder above it.

Figure 26:
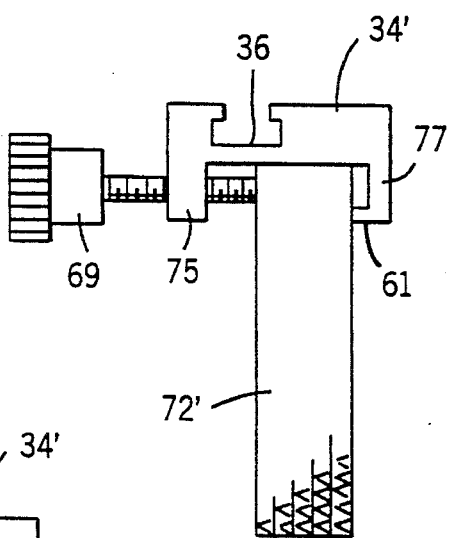
FIG. 26 is an end view of the track of FIG. 25 mounted to a wooden fence.

The auxiliary fence 72' can be a rectangular board having flat sides as shown in FIG. 26. If the fence 72' is as shown in FIG. 26, then flange 79 bears against the front flat face of the fence 72' and the inner end of the thumb screw 69 bears against the opposite face of the fence 72' to clamp the track 34' to the fence 72'. With this attachment, the screw 69 can be loosened and the track 34' slid along the top of the fence 72' or lifted therefrom and replaced on it, to change the position of the track 34' on the fence 72'.

Figure 27:
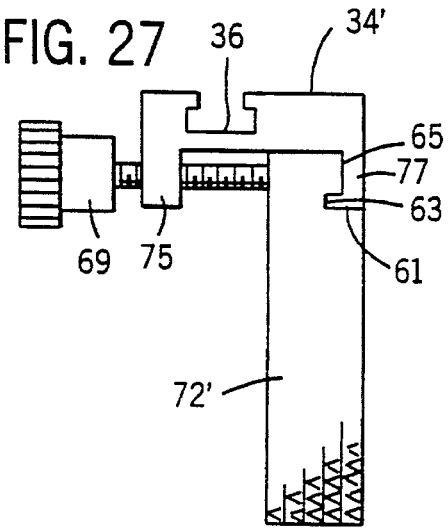
FIG. 27 is a view similar to FIG. 26 but showing the track mounted to an alternate wooden fence.
Figure 28:
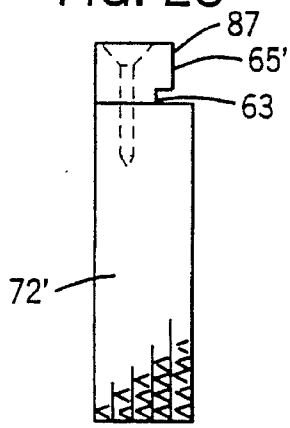
FIG. 28 is a view is an end view of an alternate fence which could be used with the track of FIG. 25.
Figure 29:
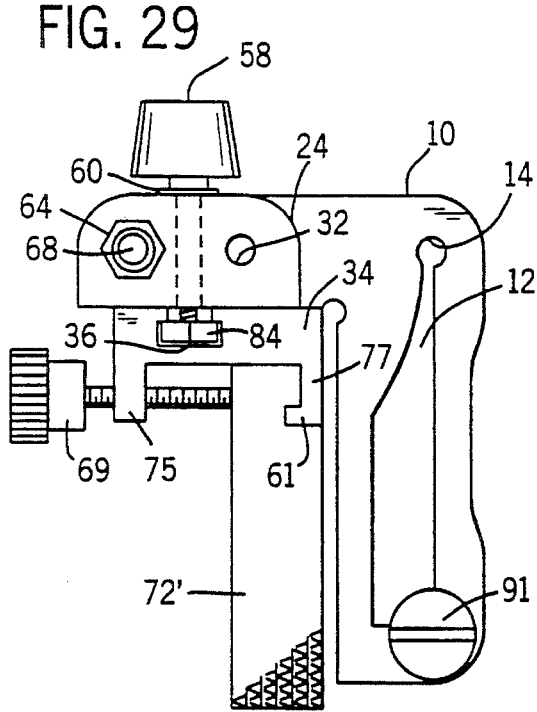
FIG. 29 is an end view of the system of FIG. 25.
Figure 30:
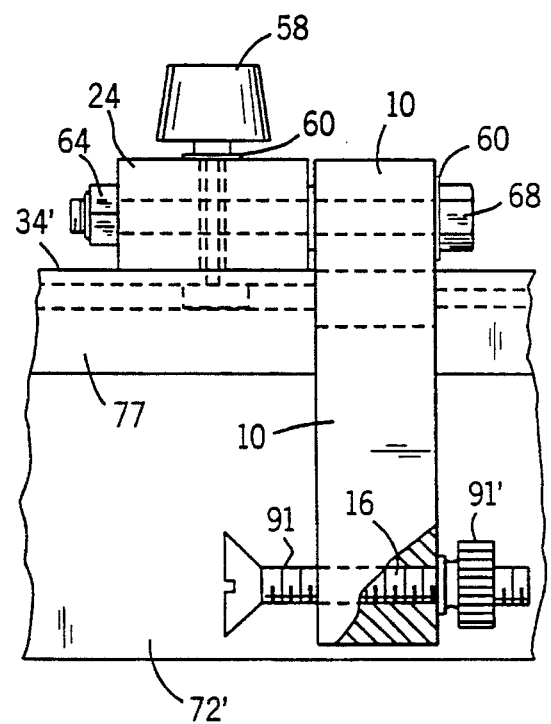
FIG. 30 is a front view of the system of FIG. 25.

Preferably, the auxiliary fence 72' is the shape shown in FIGS. 25 and 27, so as to provide a groove 63 and recessed surface 65 to receive the L-shaped flange 79, with the extension 61 received in the groove 63, and the front face of the track 34' flush with the front face of the fence 72'. This construction facilitates sliding of the track 34' along the top of the fence 72' without unduly stressing the wood of the fence 72', since it is subjected to mainly compressive forces and not shear forces. Also, the track 34' can still be lifted off of the fence 72' without sliding it all the way to the end of the fence 72', by simply backing out the screw 69 far enough so that the extension 61 can be withdrawn from the groove 63 and clear the surface 65.

The surface 65 and groove 63 can be formed in an auxiliary fence 72' like that shown in FIG. 26 by making two ⅛" saw cuts (or router cuts) at 90° to one another, one to form surface 65 and the other to form groove 63. Making such cuts can be avoided with an aluminum extrusion 87 having the cross-sectional shape shown in FIG. 28, which defines groove 63' and surface 65', and is screwed to the top of a wooden board which together with the extrusion 87 makes the auxiliary fence 72'.

Figure 31:
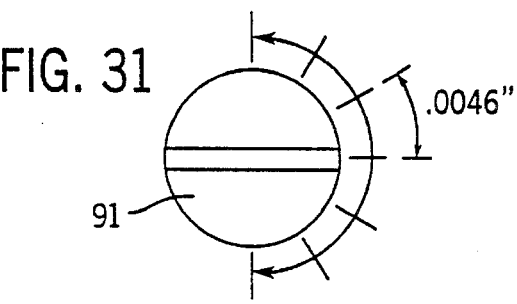
FIG. 31 is a schematic view of the head of the stop bolt of the system of FIG. 25.

Referring particularly to FIGS. 25 and 29–31, in the stop 10 shown in these figures the hole 16 is threaded to engage a flat head bolt 91. A threaded brass thumb-nut 91' is received by the screw and acts as a locknut, to maintain the setting of the bolt 91 when it is tightened against the stop 10. With a 5/16 inch standard bolt, 1/12 of a revolution results in the head of the bolt 91, which abuts the workpiece to act as the stop, moving 0.0046", as depicted in FIG. 31. Woodworkers oftentimes like to use measurements of roughly four thousandths of an inch, so by using the division of 12 similar to the divisions on a clock, a woodworker can calibrate a fine adjustment. Thus, the bolt 91 provides a form of microadjust feature to the system 1'. It should also be understood that, if desired, a microadjuster 54 could be employed in the system 1' to make fine adjustments of the base 24.

Figure 32:
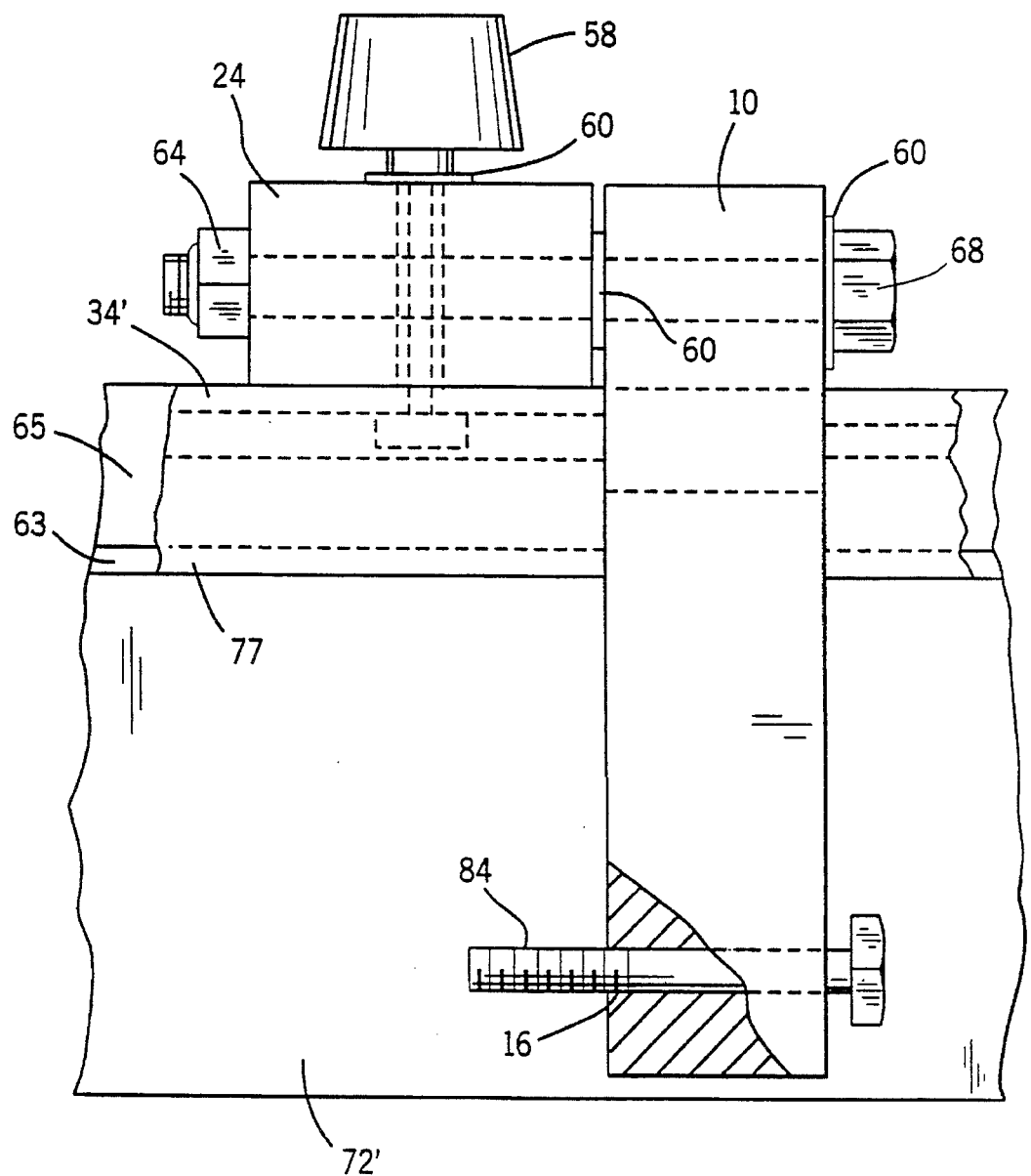
FIG. 32 is a view similar to FIG. 30 but showing an alternate bolt.
Figure 33:
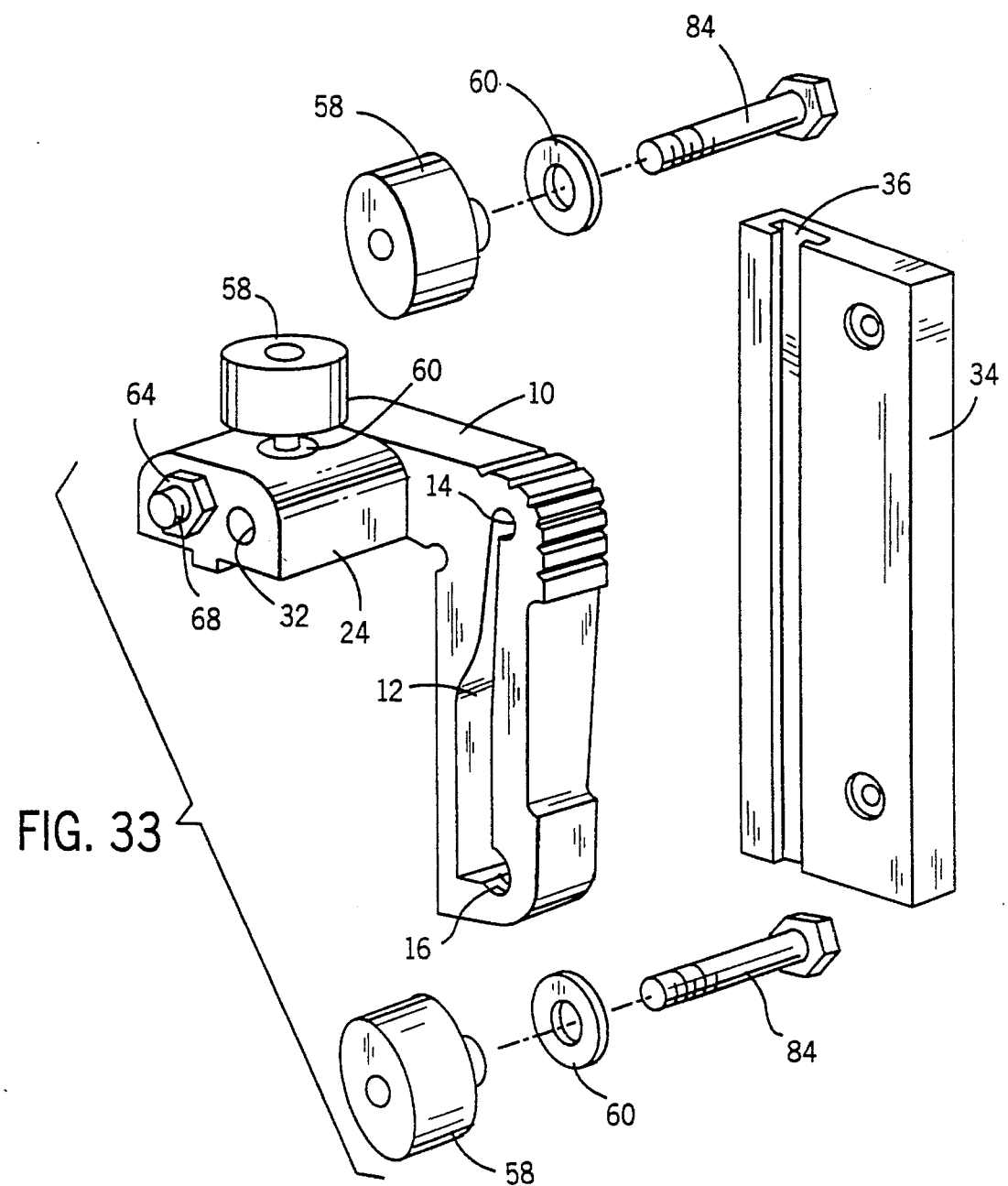
FIG. 33 is an exploded perspective view illustrating how the system can be used with the bolt of FIG. 32.

FIGS. 32 and 33 illustrate a ¼" bolt 84 through the 5/16" threaded hole 16 to illustrate how the hole 16 can still be used to mount a section of track or a fence, as discussed in connection with FIGS. 8 and 10. Since the ¼" bolt 84 is sufficiently smaller than the 5/16" threaded hole, the ¼" bolt 84 can turn in the hole 16 without significant interference.

Figure 34:
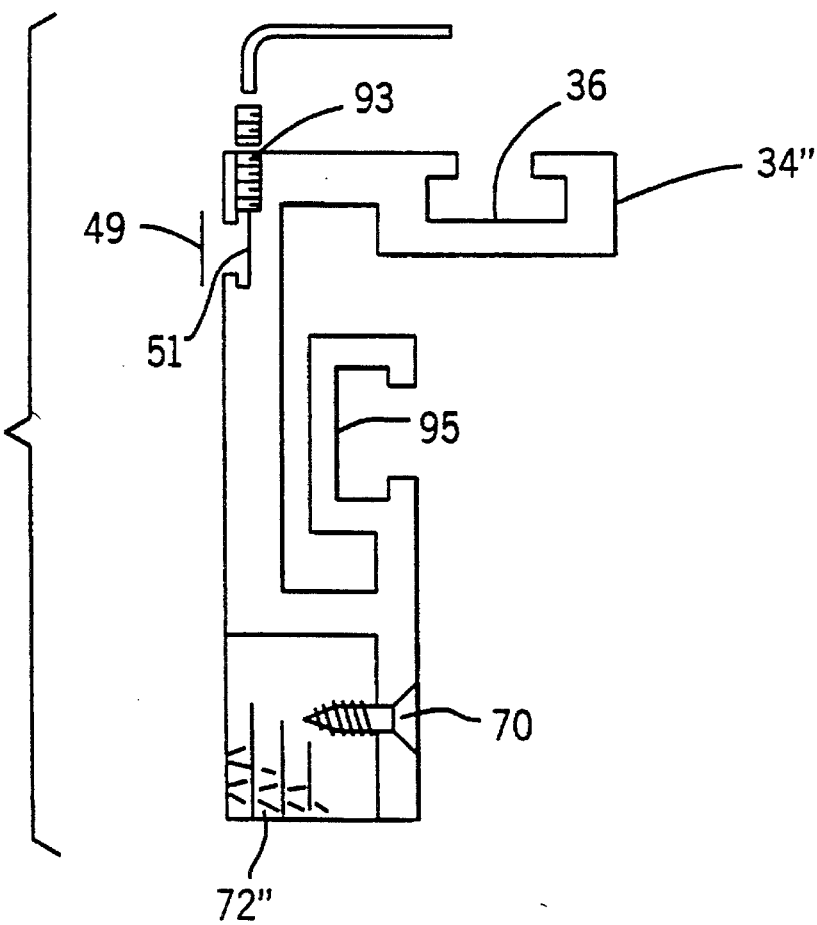
FIG. 34 is an end view of another alternate track and woodworking support of the invention.

FIG. 34 illustrates yet another embodiment of a track 34" for making a system of the invention. In the track 34", a single aluminum extrusion provides the track 34", and is screwed to a relatively small auxiliary fence 72" by screws 70. The track 34" provides slot 36, for mounting a base 24, microadjuster 54, location stops 44, etc., a slot 51 for receiving a ruler 49 and a set screw hole 93 for receiving a set screw to secure the ruler in the slot 51. The track 34" also provides a second slot 95 similar to slot 36, but used for mounting the track 34" to a miter bar in the manner described with respect to FIGS. 15A and 17, below, so that the track 34" is slidable relative to the miter bar.

Referring to FIG. 12A, the flush mounted track 34 in the middle of the band saw auxiliary table 90 shown in FIG. 10 can be used to mount other accessories, jigs and fixtures. One of the accessories which may be mounted is a circle jig point 98 upon which the work piece is secured and then rotated into the saw blade to cut a circle. Jigs and fixtures for cutting partial circles can also be placed on the point 98. The rotation point 98 shown in FIGS. 12A–E is a sharpened 1/16" nail pressed into a drilled hole in the stop 44. As previously described, the stop 44 fits into the slot 36 of the track 34 and is securable therein by set screw 82. The distance between the point 98 and the blade 94, which determines the radius of the cut, is easily measured with the ruler 49 which is secured between the track 34 and the band saw auxiliary table 90 near the blade. The track 34 should be mounted on the table 90 so that the point 98 is slidable along a line which is perpendicular to the plane of the saw blade 94 and intersecting the cutting edge of the saw blade 94.

FIG. 12E illustrates in greater detail how the ruler 49 is secured by the longitudinal indent 42 of the track 34. The angled edges 50 of the ruler extrusion 48 are secured in the angled rabbet 53 routed in the band saw auxiliary table 90 and the angled indent 42 of the track 34. As in the other applications described, the ruler 49 is tightened in place by the drywall screws 70 which secure the track 34 to the band saw auxiliary table 90.

Figure 13:
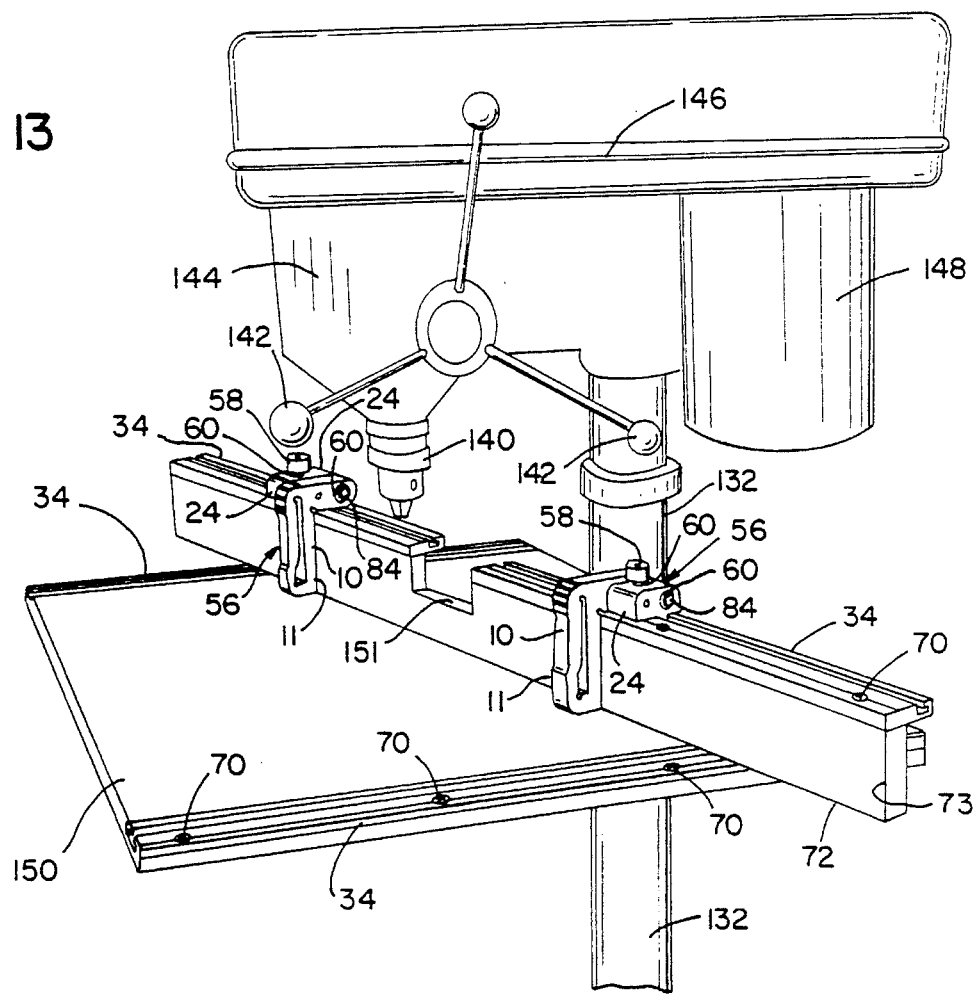
FIG. 13 is a perspective view of a system of the invention applied to a drill press auxiliary table.

FIG. 13 illustrates the application of a system of the invention to a drill press, which may be used for example to drill holes, make mortises and rotate sanding drums. The motor 148 rotates a belt covered by the guard 146 which rotates a shaft inside the head 144 to which the drill chuck 140 is attached. The chuck 140 holds the drill or router bit which are advanced into the workpiece by lowering the handle 142. The post 132 supports the top of the drill press and the table 150 supports the workpiece. Because the standard table provided with a drill press is quite small a larger auxiliary plywood table 150 is usually added to support larger workpieces.

An auxiliary fence 72 is often clamped to the table 150 to support the workpiece and to prevent it from rotating. The fence 72 is cut-out at 151 so as to clear the chuck 140 as the chuck is lowered in a drilling or routing operation. The straight edge of the fence 72 helps to make multiple holes the same distance from the edge of the workpiece and for router bit cuts parallel to the edge of a workpiece such as a mortise. A section of track 34 mounted with screws 70 on the top of the auxiliary fence 72 supports a movable flip stop assembly 56 which is adjustably secured to the track 34 in the manner previously described. The flip stop assembly 56 is used to position the end of the workpiece relative to the drill or router bit held in the chuck 140. For operations such as mortising, two flip stop assemblies 56 are used with the workpiece moving back and forth between the two stops. Multiple flip stop assemblies 56 may be used to measure multiple drill holes parallel to the edge of a workpiece, with the flip stop assemblies not used for drilling any particular hole being flipped up out of the way. The most advantage is gained with this arrangement when many workpieces of the same kind are to be made. The flip stop assemblies 56 in FIG. 13 may also be reversed and locked in position as shown in FIG. 9 to support a drop pin to space equidistant holes or to support other accessories. For example, in the locked reversed position a hold down could be attached to the flip stop 10 to secure the wood during the drilling operation.

Figure 14A:
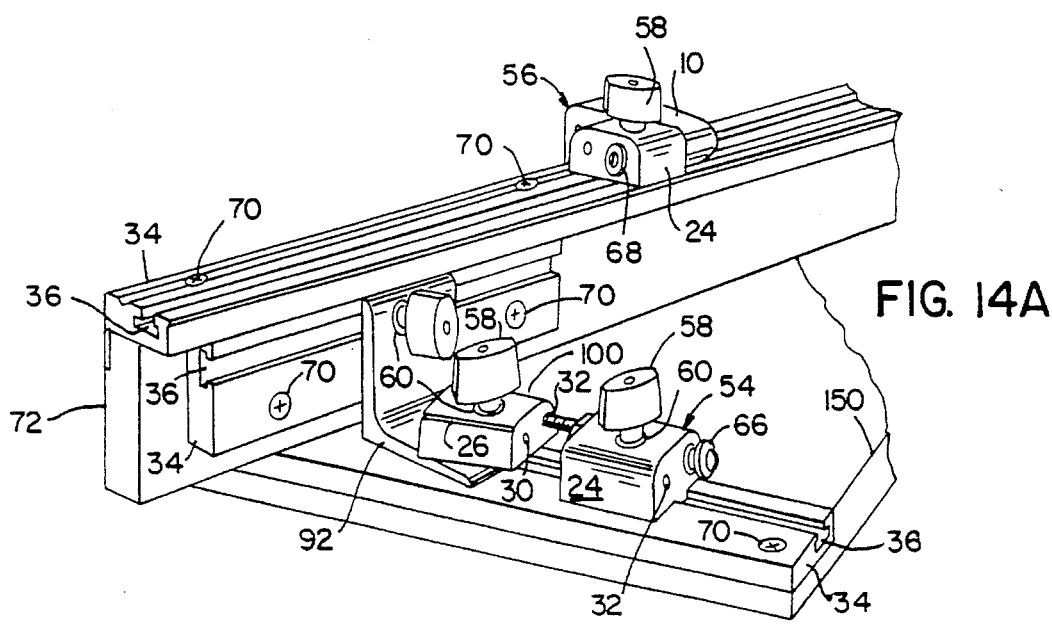
FIG. 14A is a perspective view illustrating a way of mounting the system of FIG. 13 to a drill press auxiliary table.
Figure 14B:
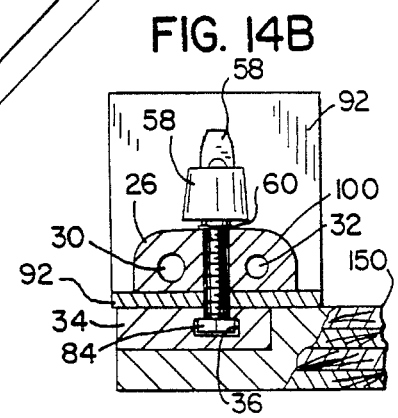
FIG. 14B is a sectional view showing an adjustable attachment of a microbase to the drill press auxiliary table shown in FIG. 14A.

FIGS. 14A and B illustrate a preferred way the fence 72 of FIG. 13 is secured to the drill press table 150. Only one end of the fence is shown, it being understood that the other end is preferably secured in the same way. Pieces of track 34 are mounted on the top surface of the drill press auxiliary table 150 to be flush therewith at opposite edges of the table. A 90 degree angle bracket 92 is secured to the track 34 by a bolt 84 (FIG. 14B) which has its head captured in slot 36 of the track 34 secured to the table. As shown in FIG. 14B, the bolt 84 extends up through a hole in the angle bracket 92 and through a hole in the microbase 100 and is secured on top of the microbase 100 with a washer 60 and knob 58. With this connection, the bracket 92 and the microbase 100 are adjustably movable parallel to the track 34 as a unit.

The microbase 100 may be made from the same extrusion as the base 24 but with protrusion 28 plus 3/16" (the thickness of angle bracket 92) machined off the bottom so that the combined thickness of the microbase 100 and bracket 92 equals the thickness of the base 24' of microadjuster 54 shown in FIG. 14A. Thus, the holes 30 and 32 of the microbase 100 are axially aligned with the respective holes 32 and 30 of the microadjuster 54.

The angle bracket 92 is adjustably secured to the fence 72 by a bolt 84 (not shown in FIG. 14A) which has its head captured in slot 36 of a section of track 34 which is screwed to the back of fence 72. A knob 58 and a washer 60 secure the angle bracket 92 to the track 34 on the back of the fence 72.

By locking both knobs 58 of each 90 degree angle bracket 92 securing the auxiliary fence 72 shown in FIGS. 13 and 14A, the fence 72 is secured to the drill press auxiliary table 150. The optional microadjuster 54 may be used to move the fence 72 in small increments in the manner described with respect to the microadjuster 54 shown in FIGS. 1A, 3, 5 and 6.

Figure 35:
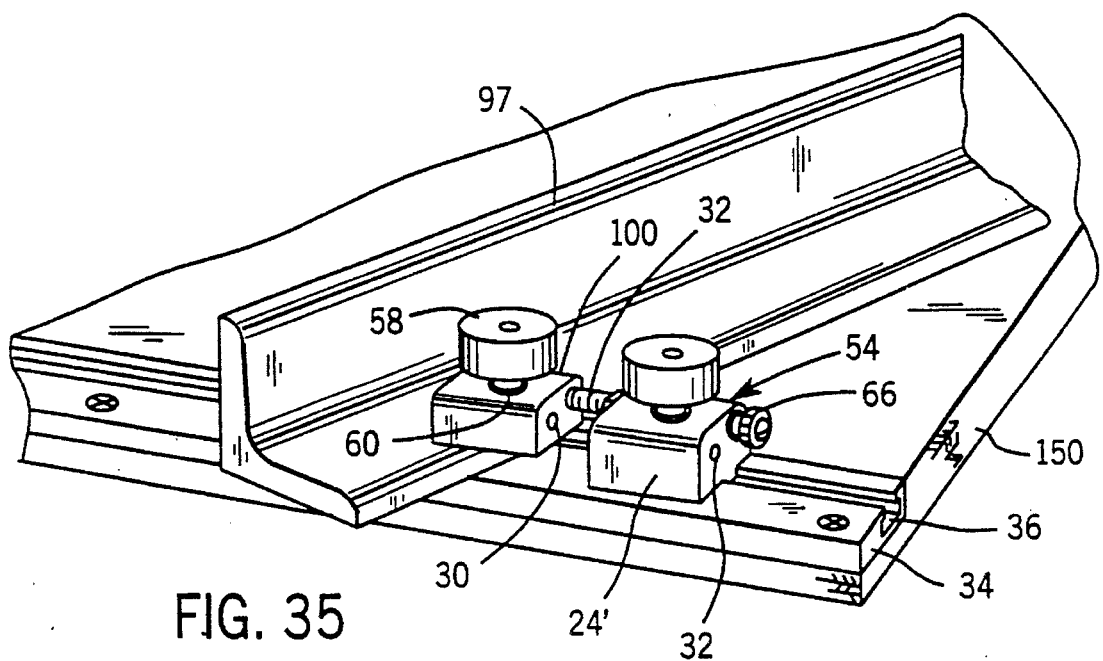
FIG. 35 is a view similar to FIG. 14A but showing an alternate construction.

FIG. 35 shows an alternate arrangement using elements of the invention to adjustable secure a fence to a table. In this case, the fence is an angle iron 97, or similarly shaped element. Thus, the arrangement shown in FIG. 35 is the same as that shown in FIG. 14A, if the element 92 were made longer and secured to both sides of the table in the manner shown, and if the elements attached to the vertical face of the element 92 were removed.

FIGS. 15A–C and 16 show a way the system can be used to mount an auxiliary fence 72 to a miter gauge head 114. The miter gauge bar 74 is fixed to the head 114 in known manner and fits in the table saw slot 112 of the table saw table 113. The miter gauge head 114 is adjustable for the desired cut angle and is locked in position with a miter gauge handle 115, as is well known. It is standard practice to expand the surface area of the miter gauge head 114 by attaching a piece of plywood 72 to the miter gauge head 114 as shown in FIG. 1. The auxiliary fence 72, jigs and/or fixtures are usually attached to the miter gauge head 114 with two screws 70. However, using screws 70 to fix the fence 72 makes it impossible to reposition the fence 72 relative to the miter head 114, or jigs or fixtures attached to the fence 72, quickly or to move the fence 72 in small increments, which is desirable when fine tuning a machine set-up.

To adjustably mount the auxiliary fence 72 on the head 114, a miter mount 102, includes a piece of plywood 104, a modified base 106 and a section of track 34. The plywood 104 is secured to the miter gauge head 114 by screws 70. The modified base 106 is the same as the base 24 but has a longitudinal hole through it through which extends a screw 108 (FIGS. 15A and 15B) which secures the base 106 to the end of the plywood 104. The base 106 is also preferably glued to the end of the plywood 104 and held thereat by a ¼" steel dowel pin 110 which extends between the base 106 and the wood 104. The hole 30 in the base 106 (and in the base 24) is preferably ¼" in diameter. A ¼" hole 109 can be drilled in the end of the plywood 104 in alignment with the hole 30 and the dowel pin 109 pressed and glued in place, mainly to prevent rotation of the base 106 relative to the plywood 104.

A section of track 34 is screwed to the back of the auxiliary fence 72 with the slot 36 opening rearwardly so as to receive the protrusion 28 of the base 106 and the heads of two bolts 84 which extend rearwardly through the plywood 104 and are tightened using washers 60 and knobs 58 on the back side of plywood 104. Preferably, the bolts 84 are standard ¼-20 bolts and the slot 36 is appropriately sized to capture their heads axially and to prevent rotation of the bolts 84, but to permit them to be slid longitudinally relative to the slot 36 when the knobs 58 are loosened. This arrangement allows the plywood auxiliary fence 72, or a jig and/or fixture attached to the fence 72 (or directly to the track 34) to be quickly replaced or repositioned.

Figure 15B:
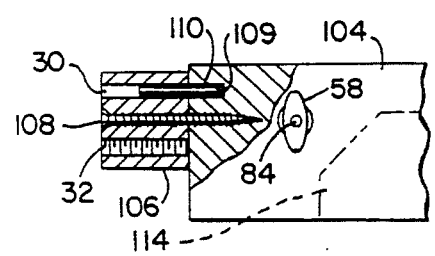
FIG. 15B is detail view partially in section of a portion of the system of FIG. 15A.
Figure 15C:
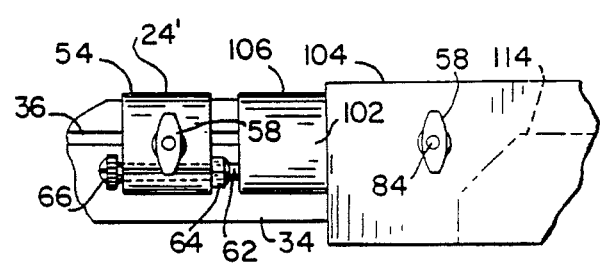
FIG. 15C is a detail view of a portion of the system of FIG. 15A illustrated incorporating a microadjuster.
Figure 16:
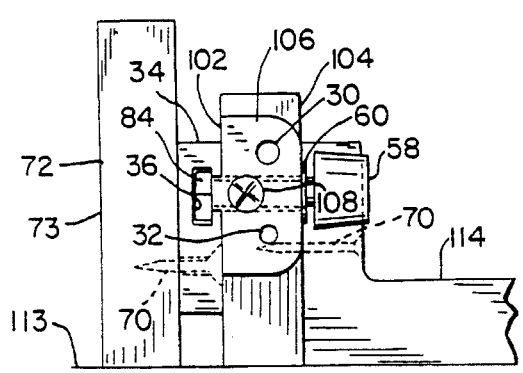
FIG. 16 is a fragmentary end elevation view of the system of FIG. 15A.

An optional microadjuster 54 may also be helpful for moving the track 34 in small increments as is often necessary for precise machine set-up, as shown in FIG. 15C. FIG. 15C shows the brass bolt 62 of the microadjuster 54 threaded into hole 32 of the base 106 of the miter mount 102. The track 34 is moved in small increments by tightening the knob 58 on the microadjuster 54 and then releasing the knobs 58 on the miter mount 102. As previously described, one complete rotation of the microadjuster 54 brass knurled knob 66 moves the track 0.050". Locking the knobs 58 of the miter mount 102 secures the track 34.

It is often helpful to be able to repeat a jig or fixture set-up at a later time. When the track 34 is accurately positioned for a set-up, the exact position is easily duplicated at a later time by removing the micro adjuster 54, if it was used, inserting a location stop 44 into abutment with the base 106, and locking the location stop 44 in place next to the base 106. To reposition the jig and/or fixture mounted on the fence 72 or directly on the track 34 at the same location after the track 34 has been removed from the mount 102, the track 34 is slid over the bolts 84, the location stop 44 is pressed against the protrusion 28 of the base 106 of the miter mount 102 and the bolts 84 are tightened with washers 60 and knobs 58.

FIGS. 36–39 illustrate a system nearly identical to that of FIGS. 15A–C and 16. The only difference is that in the system shown in FIGS. 36–39, the base 106 is deleted and instead an internally threaded brass insert 101 is fixedly secured in a hole in the plywood 104 to receive screw 62 in threaded engagement.

A standard miter gauge head 114 (as shown in FIG. 15A) is adjustable for the desired cut angle and is locked in position with a miter gauge handle 115. The adjustable miter gauge head 114 is problematic because the cut angle adjustment may slip or it may not be perfectly adjusted to the desired angle. Another problem is that the standard miter gauge bar 74 is often loose in the table miter slot 112, which causes an inaccurate cut.

Referring to FIG. 17, a solution to many of the problems of an adjustable miter gauge 114 with an undersized bar 74 is a fixed angle miter gauge 116 with a head 118 fixed at exactly 90° to an adjustable width miter bar 120. The adjustable miter gauge bar 120 fits in a standard table saw slot 112 of a standard table saw table 113. The 90° fixed angle miter head 118 is preferably a 2"×2"×3⁄16" piece of 90° angle aluminum extrusion and is fastened to the adjustable width miter bar 120 with one smooth head ¼" by ⅜" bolt 122 and two 3⁄16" roll pins 124, which holds the angle of the head 118 on the bar 120 very accurately at 90°. A handle 115 is fixed on the back of the adjustable width miter bar 120.

It is standard practice to lengthen a miter gauge head 114 or 118 by attaching a piece of plywood to the miter gauge head as shown in FIG. 1. Plywood fences, jigs and/or fixtures are usually attached to a miter gauge head with screws, and two chamfered holes 128 on opposite ends of the miter head 118 are provided for such attachment. However, as explained above, using screws for this attachment makes it difficult to reposition an auxiliary fence 72 or a jig and/or fixture quickly or to move it in small increments which is desirable when fine tuning a machine set-up. Therefore, a fence 72 and/or a jig and/or fixture may be secured to the head 118 in a manner similar to that shown in and described with respect to FIGS. 15A–C and 16. In FIG. 17, the plywood 104 is unnecessary because the bolts 84 extend through holes in the vertical flange of the head 118. Two 1¼" bolts 84 placed in holes 126 on opposite sides of the miter gauge head 118 have their heads received in the track 34 which is screwed to a plywood auxiliary fence 72, jig and/or fixture. The track 34 is secured to the fixed miter head 118 with washers 58 and knobs 60. This design allows the plywood auxiliary fence 72, or a jig and/or fixture to be quickly replaced or repositioned.

Where fine adjustments are desired, a microbase 100 is used in conjunction with a microbase 24. The optional microbase 100 when used with the microadjuster 54 is helpful for moving the track 34 in small increments as is often necessary for precise machine set-up. The microbase 100 is secured to the miter gauge head 118 with a 1¼" bolt 84, washer 60 and knob 58. The brass bolt 62 of the microadjuster 54 is rotated into the tapped hole 32 of the microbase 100. The track 34 is moved in small increments by tightening the knob 58 on the microadjuster 54 and then releasing the knobs 58 on the fixed miter head 118, and turning the knurled knob 66 to the desired new position. Locking the knobs 58 of the fixed miter head 118 secures the track 34.

It is often helpful to be able to repeat a jig or fixture set-up at a later time. When the track 34 is accurately positioned for a set-up, the exact position is easily duplicated by removing the microadjuster 24, if it was used, and inserting a bolt 84 with its head captured in the slot 36 and with 3 washers 60 above the groove and abutting the edge of the head 118 (assembly not shown). A knob 58 may be used to lock the bolt 84 and washers in place next to the miter gauge head 118. To reposition the fence 72, jig and/or fixture, the track 34 is slid over the bolts 84 and the bolt 84 with 3 washers 60 is pressed against the fixed miter head 118 and the knobs 58 are tightened.

FIG. 18 illustrates an anti-play feature 81 of the bar 120 whereby the bar 120 is effectively adjustable in width to eliminate play between the bar 120 and the slot 112 in the table 113. A hole 85 is bored in the side of the bar 120 and one end of the hole 85 is threaded at 83. The hole 85 is of a size to slidably receive at its unthreaded side a 3/16" diameter cylindrical bearing 130. The bearing 130 is preferably made of fiber reinforced graphite impregnated phenolic material such as a graphite impregnated canvas base phenolic material. A 10/32 set screw 82 is threaded into the threaded hole 83 and is used to push the bearing 130 out of the hole 85 so as to abut its end 131 against the side of the slot 112. The threads of the screw 82 or of the hole 83 may be roughened to resist turning of the screw in the hole 83 during operation of the bar 120. Preferably, an antiplay feature 81, including the hole 85, the bearing 130 and the screw 82, is provided every 5" along the length of the bar 120.

Figure 40:
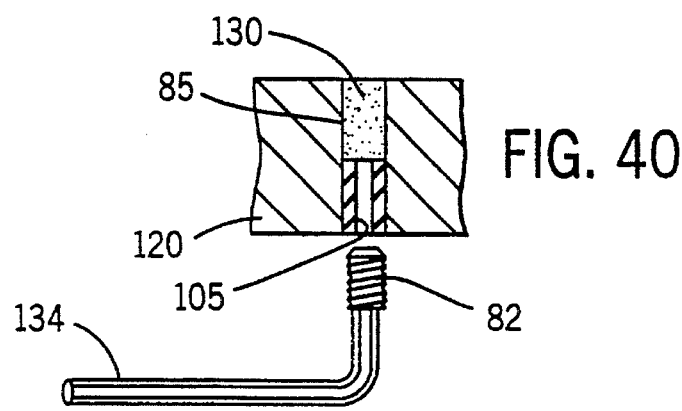
FIG. 40 is a view similar to FIG. 18 but showing an alternative embodiment of a miter bar of the invention.

FIG. 40 illustrates an alternative construction in which the hole 85 is not threaded. Instead, after the hole 85 is bored, a tubular rubber insert 105 which fits tightly in the hole 85 is inserted into one end of the hole, and the set screw 82 is screwed into it. The bearing 130 is inserted into the other end of the hole 85 as described above, and the screw 82 adjusted to provide a tight sliding fit of the miter bar in the miter slot. This construction avoids tapping the hole 85.

Some table saw miter slots 112 are very rough so that the bearing 130 may undesirably wear very quickly. In such slots, the bearing 130 can be removed and the set screw 82 reversed as shown in FIG. 19 so that it can be screwed out from the unthreaded side of hole 85 with an allen wrench 134. Alternatively, the set screw need not be reversed, and could have its recessed end bear against the miter slot. The hard tip of the set screw 82 is not worn down significantly by a table saw miter slot 112.

Figure 22:
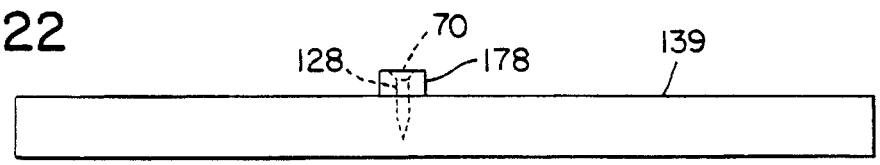
FIG. 22 is an end elevation view of the assembly of FIG. 21.

An anti-play feature 81 may be applied to any type of miter guide, such as a standard miter guide as shown in FIG. 15A, a 45° fixed angle miter guide 136 as shown in FIG. 20, or a miter guide table as shown in FIGS. 21 and 22. Mitered cuts made at 45° are the most common cut made with a standard miter gauge other than the 90° crosscut. In making mating 45° angle cuts, it is critical that the workpiece be held securely so that it does not move during the cut creating a surface that it not straight or at the desired angle. Also, stops should be used to measure the distance between the end of the workpiece and the blade so all of the pieces are exactly the same length. Four workpieces with perfectly cut 45 degree angles will not make a perfect square frame unless all four are exactly the same length.

One side of a length of wood, such as wood molding or decorative framing, is often cut in a decorative shape. When making a 45 degree mitered corner with such a workpiece, two miter gauge settings are required. Ideally, one workpiece is cut with the miter gauge in the table slot 112 on the left of the blade 76 and the other workpiece is cut with the miter gauge in the table slot 112 on the right side of the blade 76. Both of these cuts should be made with the miter gauge head 114 angled 135° from the face of the blade. The advantage of this obtuse angle is that the cutting force of the blade can be negated with a stop on the opposite end of the workpiece preventing the wood from moving during the cut. A stop can be provided using a system of the invention, such as using the set-up shown in FIG. 1A. Also, with the 45° fixed angle miter gauge 136 shown in FIG. 20, no set-up of the miter gauge is required since one of the heads 118 can be used on one side of the blade 76 and the other head 118 can be used on the other side of the blade 76.

The two heads 118 of the guide 136 are 90° angle 2" by 2" by 3/16" pieces angled at opposite 45° angles on the bar 120 so that they are nonparallel and face one another. When the fixed angle miter gauge 136 is in the left table slot 112. The heads 118 in guide 136 are fixed to the bar 120 using a bolt 122 and roll pins 124, as is the head 118 of guide 116.

FIGS. 21 and 22 illustrated jig and fixture bar 138 which is made of a standard size steel bar for miter guide bars (3/8" by ¾"). Bar 138 is the same as bar 120, having spaced apart anti-play features 81, but also has three chamfered holes 128 through which a screw 70 extends to secure the bar 138 to a guide table 139, which can be used as a base or foundation for mounting jigs and fixtures for holding, clamping, otherwise manipulating a workpiece as it is moved into the blade.

Figure 23:
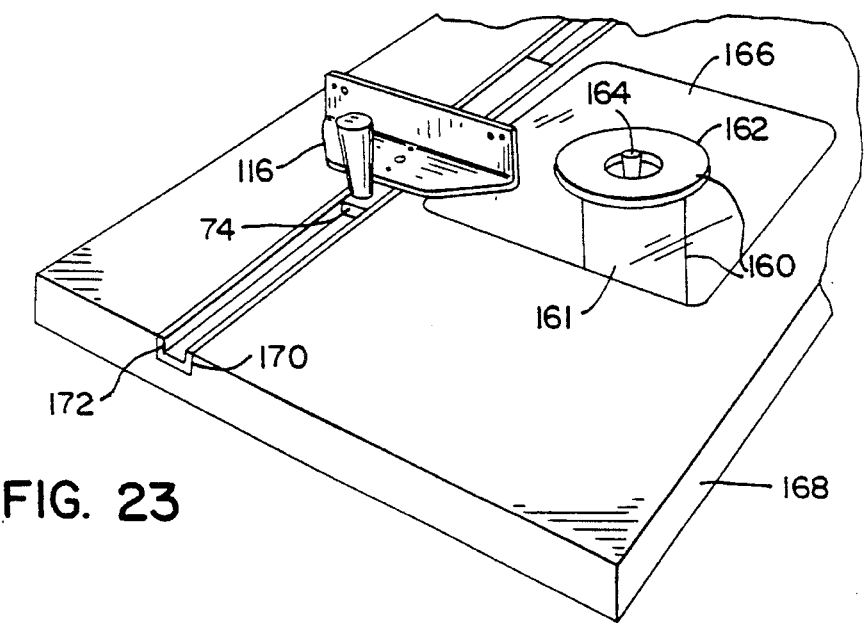
FIG. 23 is a partial perspective view of a system of the invention applied to a router table.

The router has become one of the most important woodworking tools in recent years. Referring to FIG. 23, a router 160 consists of a motor 161 and a base 162. The router bit 164 is secured to the end of the motor arbor. Precisely controlling the router is difficult. With large workpieces, a straight edge is usually clamped to the workpiece and the router base 162 is pressed against the straight edge during the cut.

Small pieces are especially difficult to rout, so the router 160 is often reversed with the router bit 164 pointing up and positioned in the middle of a surface which is called a router table 168. The router table 168 makes it easier to control small workpieces. A large auxiliary router base 166 of thick clear plastic is often screwed to the router base 162 and fitted into a hole in the top of the router table 168. Gravity holds the router 160 and the auxiliary router base 166 in the router table 168 and the router 160 is easily removed from the table for making bit changes and adjustments. Router tables 168 were originally shop made from plywood but in recent years tables normally made from 1½" medium density fiberboard have become available.

A straight edge or a fence clamped to the router table 168 is the usual way of controlling a workpiece for a cut parallel to the edge of the board. One option utilizing the invention for a router table fence is shown in FIG. 13.

However, there is no good way to make cuts across the grain or to hold workpieces on edge, which are necessary for making joints such as finger joints and require moving the fence with the workpiece. A solution to this problem is to use a miter gauge such as miter gauge 116 to control the workpiece as it is advanced past the cutter 164. A dado cut 172 in the router table would allow the use of the miter gauge 116 with the router table 168. However, the miter gauge 116 would wear the dado 172 in the plywood or medium density fiber board and there would not be a satisfactory way of adjusting the fit between the miter gauge bar 74 and the dado 172.

Figure 24:
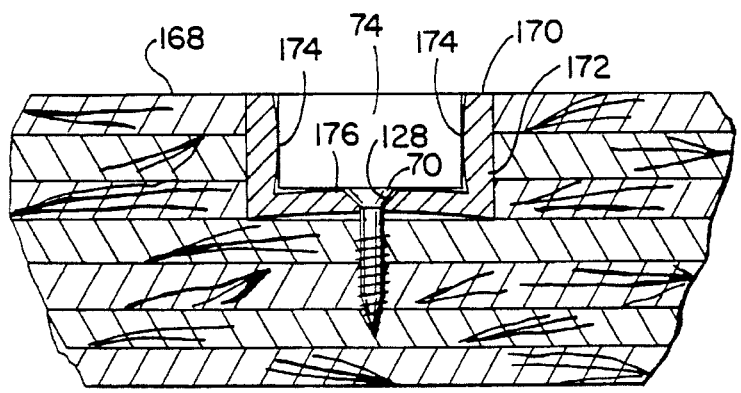
FIG. 24 is a detail view of a portion of FIG. 23.

An adjustable U-shaped channel 170 (See also FIG. 24) is designed to solve the above mentioned problems of router table dado 172 wear and lack of adjustment between the miter gauge bar 74 and the dado 172. The channel 170 is preferably made of a relatively hard but flexible material such as extruded aluminum, but could also be made of other materials having the required hardness and flexibility, such as steel or perhaps some plastics. The inside of the U-shaped channel 170 is slightly larger than the ⅜" by ¾" miter gauge bar 74. The adjustable U-shaped channel 170 fits into the dado 172 cut in the router table 168 and is attached to the router table 168 with a drywall screw 70 inserted through a chamfered hole 128 in the bottom wall 175 of the channel 176 as shown in FIG. 24. The bottom wall 175 is arced so as to be convex away from the direction of the insertion of screw 70 (toward the top), and the inner surfaces 174 of the sidewalls of the channel 176 are preferably bowed inwardly so as to be convex toward one another. The exterior surfaces of the sidewalls of the channel 176 may be flat.

As the screw 70 is advanced into the router table 168, the bottom of the U-shaped channel 176 flexes downwardly so as to flatten slightly and the inside walls 174 move toward each other as a result, allowing an adjustable fit between the inside of the U-shaped channel 170 and the miter gauge bar 74. By adjusting the fit between the inside of the U-shaped channel 170 and the miter gauge bar 74, sloppiness between the bar 74 and the channel 170 can be eliminated thereby improving the accuracy of the workpiece, jig and or fixture setup.

Figure 41:
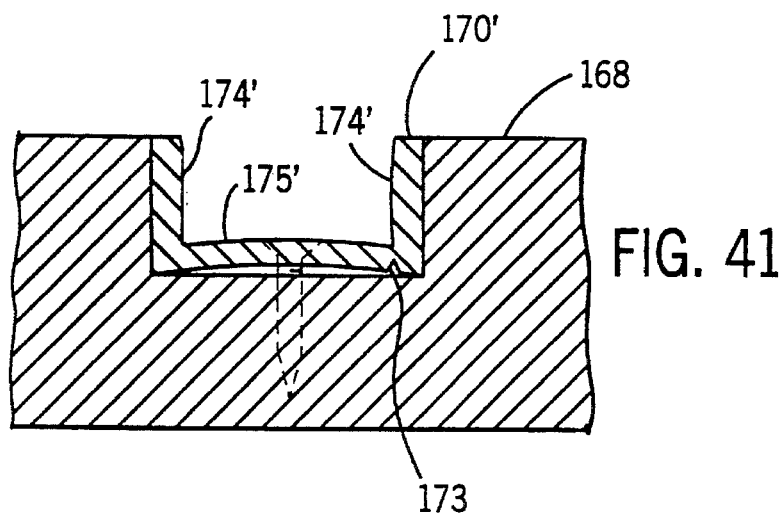
FIG. 41 is a view similar to FIG. 24 but showing an alternative embodiment of a miter bar channel of the invention.
Figure 42:
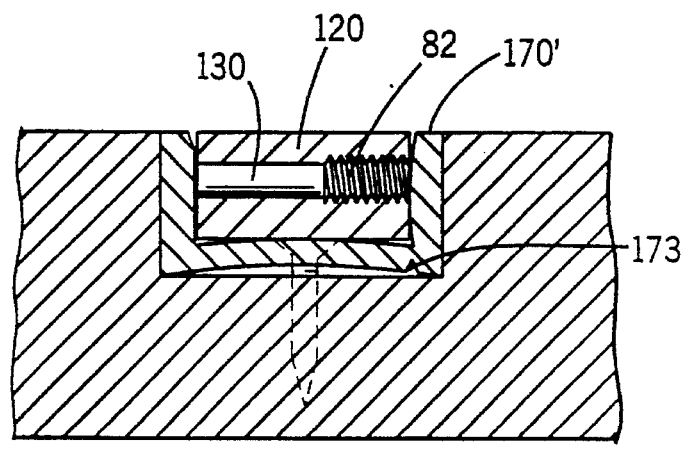
FIG. 42 is a view similar to FIG. 41 showing a miter bar of the invention in the miter bar channel.

An alternative channel 170' as shown in FIGS. 41 and 42 is the same as the channel 170 except that it has the lower portion of the left (as shown in FIGS. 41 and 42) interior surface 174' flat and has a longitudinally running V-shaped notch 173 in the exterior surface of its bottom wall 175' adjacent to the right (as shown in FIG. 41) surface 174'. The notch 173 causes most of the inward bending of the sidewalls to be performed by the right sidewall (as shown in FIGS. 41 and 42), and causes that bending to be more uniform over the length of the right sidewall. The flat lower portion of the left surface 174' provides a flat surface for the bearings 130 to bear against as shown in FIG. 42, so that as the bearings 130 slide along the flat side as the miter bar is slid in the channel 170', the bearings 130 do so exerting uniform pressure against that side, even though the right sidewall of the channel 170' may not be uniformly bent in over its length, but may be somewhat "wavy" over its length.

The U-shaped channel 170 or 170' can also be used to make jigs and fixtures and can be used with other tools such as the drill press or radial arm saw. For example the ideal strategy for using the radial arm saw is to use a jig or a fixture to angle the workpiece rather than rotating the radial arm because the saw is more accurate when the arm is in the fixed 90 degree position. The U-shaped channel 170 or 170' can be used as part of an auxiliary table for the radial arm saw, allowing the standard miter gauge to be used to angle the workpiece in relationship to the radial arm saw blade.

A woodworking machinery jig and fixture system incorporating the invention has been described above in considerable detail. Modifications and variations will be apparent to those in the art which will still incorporate the invention. For example, rather than a T-shaped slot, the guide 36 could be a slot of some other shape or a ridge or guide rail, provided the components mounted to the guide were suitably modified to be releasably securable to the track and adjustably slidable on the guide. Therefore, the invention should not be limited to the scope of the foregoing description, but should be defined by the claims which follow.

I claim:

1. A woodworking machinery guide, comprising:

a workpiece support; and a guide bar secured to said workpiece support for sliding in a slot of a woodworking machinery table, said guide bar having opposed sides and an anti-play feature in which:

a bore extends through said bar from one of said sides of said bar to the other side;

a bearing is received in said bore;

a set screw is received in said bore so that tightening said set screw causes said set screw to bear against one end of said bearing so as to exert pressure against a side of the slot in the woodworking machinery table at the other end of said bearing.

2. A woodworking machinery guide as in claim 1, wherein said workpiece support is an adjustable miter head, a miter head secured to said guide bar at a fixed 90° angle, a miter head secured to said guide bar at a fixed 45° angle or a support table.

3. A woodworking machinery guide as in claim 1, wherein said bar has multiple anti-play features spaced apart along its length.

4. A woodworking machinery guide as in claim 1, wherein said screw is reversible in said bore so that it can be tightened to bear directly against a side of the slot in the woodworking machinery table.

5. A woodworking machinery guide as in claim 1, wherein said screw is threadedly engaged with said bar in said bore.

6. A woodworking machinery guide as in claim 1, wherein said screw is threadedly engaged with a tubular elastomeric member which is received in said bore.

* * * * *